United States Patent
Sun et al.

(10) Patent No.: US 11,652,678 B2
(45) Date of Patent: May 16, 2023

(54) MULTI-SYMBOL SELF-CONTAINED WAVEFORM DESIGN

(71) Applicant: QUALCOMM Incorporated, San Diego, CA (US)

(72) Inventors: Jing Sun, San Diego, CA (US);
Xiaoxia Zhang, San Diego, CA (US);
Tao Luo, San Diego, CA (US);
Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/362,594

(22) Filed: Jun. 29, 2021

(65) Prior Publication Data
US 2021/0328743 A1    Oct. 21, 2021

Related U.S. Application Data

(62) Division of application No. 16/810,604, filed on Mar. 5, 2020, now Pat. No. 11,088,799.
(Continued)

(51) Int. Cl.
*H04K 1/00* (2006.01)
*H04L 27/28* (2006.01)
(Continued)

(52) U.S. Cl.
CPC ........ *H04L 27/2607* (2013.01); *H04L 5/0044* (2013.01); *H04L 5/0048* (2013.01);
(Continued)

(58) Field of Classification Search
CPC . H04L 5/0048; H04L 27/2613; H04L 27/265; H04L 27/2636; H04L 27/2607;
(Continued)

(56) References Cited

U.S. PATENT DOCUMENTS

| | | | |
|---|---|---|---|
| 2011/0305286 A1* | 12/2011 | Shimezawa | ......... H04L 27/2646 375/295 |
| 2012/0020437 A1* | 1/2012 | Furudate | ............... H04L 25/022 375/316 |

(Continued)

FOREIGN PATENT DOCUMENTS

| | | |
|---|---|---|
| WO | WO2016114824 A1 | 7/2016 |
| WO | WO2017201273 A1 | 11/2017 |

OTHER PUBLICATIONS

Intel Corporation: "Further Discussion on GI-DFT-s-OFDM for High Frequency Bands above 40 GHz", 3GPP Draft, 3GPP TSG RAN WG1 Meeting #87, R1-1612589, 3rd Generation Partnership Project (3GPP), Mobile Competence Centre, 650, Route Des Lucioles, F-06921 Sophia-Antipolis Cedex, France, vol. RAN WG1, No. Reno.USA; Nov. 14, 2016-nov. 18, 2016 ,Nov. 13, 2016, XP051176534, Retrieved from the Internet: URL:http://www.3gpp.org/ftp/Meetings_3GPP_SYNC/RAN1/Docs/ [retrieved on Nov. 13, 2016], 9 pages.

(Continued)

*Primary Examiner* — Phuong Phu
(74) *Attorney, Agent, or Firm* — Holland & Hart LLP

(57) ABSTRACT

Methods, systems, and devices for wireless communications are described that may enable a user equipment (UE) or base station (e.g., a next-generation NodeB (gNB)) to identify that a waveform to be generated for a scheduled transmission is formed by one or more reference signal symbols and one or more data symbols. The waveform may be contained between a beginning boundary and an ending boundary with a duration equal to a total length of the one or more reference signal symbols and the one or more data symbols. The UE, base station, or both may generate the waveform by inserting a guard internal in the one or more reference signal symbols and the one or more data symbols to enable a receiver to perform a fast Fourier transform (FFT) for each of the one (Continued)

or more reference signal symbols and the one or more data symbols.

30 Claims, 21 Drawing Sheets

Related U.S. Application Data

(60) Provisional application No. 62/816,011, filed on Mar. 8, 2019.

(51) Int. Cl.
*H04L 27/26* (2006.01)
*H04L 5/00* (2006.01)

(52) U.S. Cl.
CPC ........ *H04L 5/0051* (2013.01); *H04L 27/2602* (2013.01); *H04L 27/265* (2013.01); *H04L 27/2613* (2013.01); *H04L 27/2636* (2013.01); *H04L 27/26132* (2021.01)

(58) Field of Classification Search
CPC .. H04L 25/02; H04L 27/2646; H04L 25/0224
USPC ........................................ 375/260, 246, 349
See application file for complete search history.

(56) References Cited

U.S. PATENT DOCUMENTS

| | | |
|---|---|---|
| 2018/0331870 A1 | 11/2018 | Sun et al. |
| 2019/0097859 A1* | 3/2019 | Bala .................... H04L 25/0224 |
| 2020/0287679 A1 | 9/2020 | Sun et al. |

OTHER PUBLICATIONS

Interdigital Communications: "Channel Estimation and Phase Tracking for Unique Word DFT-s-OFDM", 3GPP Draft, 3GPP TSG-RAN WG1 Meeting #86, R1-167560, Channel Estimation and Phase Tracking for Unique Word DFT-s-OFDM, 3RD Generation Partnership Project (3GPP), Mobile Competence Centre, 650, Route Des Lucioles, F-06921, Sophia-Antipolis Cedex, France, vol. RAN WG1, No. Gothenburg, Sweden; Aug. 22, 2016-Aug. 26, 2016, Aug. 21, 2016 (Aug. 21, 2016), XP051140715,7 pages, Retrieved from the Internet: URL: http://www.3gpp.org/ftp/Meetings_3GPP_SYNC/RAN1/Docs/ [retrieved on Aug. 21, 2016], paragraph [0002].
International Search Report and Written Opinion—PCT/US2020/021413—ISA/EPO—Jun. 9, 2020.

* cited by examiner

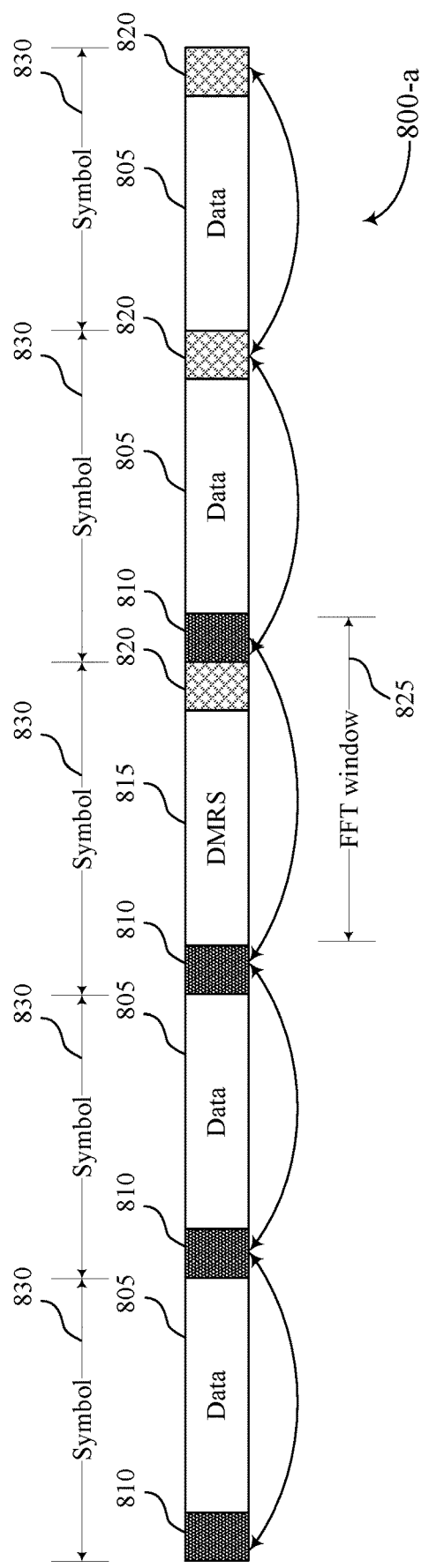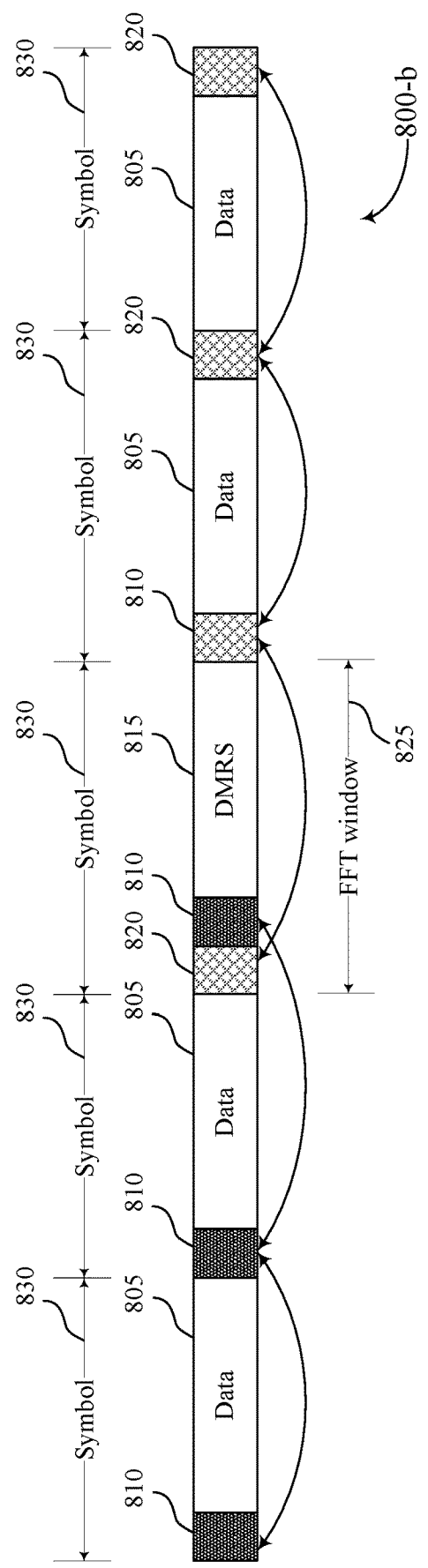
FIG. 8A
FIG. 8B

MULTI-SYMBOL SELF-CONTAINED WAVEFORM DESIGN

CROSS REFERENCE

The present application for patent is a Divisional of U.S. patent application Ser. No. 16/810,604 by SUN et al., entitled "MULTI-SYMBOL SELF-CONTAINED WAVEFORM DESIGN" filed Mar. 5, 2020, which claims the benefit of U.S. Provisional Patent Application No. 62/816,011 by SUN et al., entitled "MULTI-SYMBOL SELF CONTAINED WAVEFORM DESIGN," filed Mar. 8, 2019, assigned to the assignee hereof, and expressly incorporated herein.

BACKGROUND

The following relates generally to wireless communications, and more specifically to multi-symbol self-contained waveform design.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations (e.g., a next-generation NodeB or giga-NodeB (either of which may be referred to as a gNB)) or network access nodes, each simultaneously supporting communication for multiple communication devices, which may be otherwise known as user equipment (UE). In some examples, base stations and UEs may generate waveforms including data, control, or reference signals. These waveforms may be single carrier waveforms. Existing techniques for generating and processing these waveforms may be lacking.

SUMMARY

The described techniques relate to improved methods, systems, devices, and apparatuses that support a multi-symbol self-contained waveform design. Generally, the described techniques support generating a waveform that may be contained between a beginning boundary and an ending boundary of a symbol or a slot, and the generated waveform may have a duration equal to a total length of the reference signal symbols and the data symbol periods. In some examples, the generated waveform may include guard intervals (made up of segments of reference signal sequences), which may be inserted relative to a reference signal symbol or a data symbol, or both. In these examples, the duration of the generated waveform may be equal to a sum of the reference signal symbols, data symbols and corresponding guard intervals. Further the described techniques may enable a user equipment (UE) or base station (e.g., a next-generation NodeB (that may be referred to as a gNB)) to perform a fast Fourier transform (FFT) on the generated waveform for each reference signal symbol and data symbol. The described techniques related to multi-symbol self-contained waveform design may provide advantages, such as uniform FFT windows across a set of symbol periods, which in return may provide further benefits for channel estimation.

A method for wireless communications is described. The method may include identifying that a waveform to be generated for a scheduled transmission is formed by one or more reference signal symbols and one or more data symbols, the waveform to be contained between a beginning boundary and an ending boundary with a duration equal to a total length of the one or more reference signal symbols and the one or more data symbols, generating the waveform by inserting a guard internal in the one or more reference signal symbols and the one or more data symbols to enable a receiver to perform an for each of the one or more reference signal symbols and the one or more data symbols, and transmitting the waveform between the beginning boundary and the ending boundary.

An apparatus for wireless communication is described. The apparatus may include a processor, memory in electronic communication with the processor, and instructions stored in the memory. The instructions may be executable by the processor to cause the apparatus to identify that a waveform to be generated for a scheduled transmission is formed by one or more reference signal symbols and one or more data symbols, the waveform to be contained between a beginning boundary and an ending boundary with a duration equal to a total length of the one or more reference signal symbols and the one or more data symbols, generate the waveform by inserting a guard internal in the one or more reference signal symbols and the one or more data symbols to enable a receiver to perform an for each of the one or more reference signal symbols and the one or more data symbols, and transmit the waveform between the beginning boundary and the ending boundary.

Another apparatus for wireless communication is described. The apparatus may include means for identifying that a waveform to be generated for a scheduled transmission is formed by one or more reference signal symbols and one or more data symbols, the waveform to be contained between a beginning boundary and an ending boundary with a duration equal to a total length of the one or more reference signal symbols and the one or more data symbols, means for generating the waveform by inserting a guard internal in the one or more reference signal symbols and the one or more data symbols to enable a receiver to perform an for each of the one or more reference signal symbols and the one or more data symbols, and means for transmitting the waveform between the beginning boundary and the ending boundary.

A non-transitory computer-readable medium storing code for wireless communication is described. The code may include instructions executable by a processor to identify that a waveform to be generated for a scheduled transmission is formed by one or more reference signal symbols and one or more data symbols, the waveform to be contained between a beginning boundary and an ending boundary with a duration equal to a total length of the one or more reference signal symbols and the one or more data symbols, generate the waveform by inserting a guard internal in the one or more reference signal symbols and the one or more data symbols to enable a receiver to perform an for each of the one or more reference signal symbols and the one or more data symbols, and transmit the waveform between the beginning boundary and the ending boundary.

Some examples of the method, apparatuses, and non-transitory computer-readable medium described herein for generating the waveform may further include operations, features, means, or instructions for generating the waveform using a same reference signal sequence in a pair of adjacent reference signal symbols of the one or more reference signal symbols.

Some examples of the method, apparatuses, and non-transitory computer-readable medium described herein for generating the waveform may further include operations, features, means, or instructions for generating the waveform, when first and second reference signal symbols of the one or more reference signal symbols are adjacent, based at least in part on including a first reference signal segment as a beginning segment in each of the first and second reference signal symbols and a second reference signal segment as an ending segment of each of the first and second reference signal symbols, and different middle segments in each of the first and second reference signal symbols.

Some examples of the method, apparatuses, and non-transitory computer-readable medium described herein for generating the waveform may further include operations, features, means, or instructions for generating the waveform, when a data symbol of the one or more data symbols occurs prior to a reference signal symbol of the one or more reference signal symbols, based at least in part on repeating a beginning segment of a reference signal sequence of the reference signal symbol as a beginning segment in the data symbol as a guard interval.

Some examples of the method, apparatuses, and non-transitory computer-readable medium described herein for generating the waveform may further include operations, features, means, or instructions for generating the waveform, when a data symbol of the one or more data symbols occurs right after a reference signal symbol of the one or more reference signal symbols, based at least in part on repeating an ending segment of a reference signal sequence of the reference signal symbol as an ending segment in the data symbol as guard interval.

In some examples of the method, apparatuses, and non-transitory computer-readable medium described herein, the one or more reference signal symbols is a single reference signal symbol. Some examples of the method, apparatuses, and non-transitory computer-readable medium described herein for generating the waveform may further include operations, features, means, or instructions for generating the waveform, when the single reference signal symbol with a data symbol of the one or more data symbols occurs right after the single reference signal symbol, based at least in part on repeating a beginning segment of a reference signal sequence included in the single reference signal symbol as a beginning segment in the data symbol as a guard interval.

In some examples of the method, apparatuses, and non-transitory computer-readable medium described herein, the one or more reference signal symbols is a single reference signal symbol. Some examples of the method, apparatuses, and non-transitory computer-readable medium described herein for generating the waveform may further include operations, features, means, or instructions for generating the waveform, when a data symbol of the one or more data symbols occurs right before the single reference signal symbol, based at least in part on repeating an ending segment of a reference signal sequence included in the single reference signal symbol as an ending segment in the data symbol as a guard interval.

In some examples of the method, apparatuses, and non-transitory computer-readable medium described herein, the one or more reference signal symbols is a single reference signal symbol. Some examples of the method, apparatuses, and non-transitory computer-readable medium described herein for generating the waveform may further include operations, features, means, or instructions for generating the waveform based at least in part on repeating a beginning segment of a reference signal sequence included in the single reference signal symbol as a beginning segment in all data symbols of the one or more data symbols that occur before and after the single reference signal symbol as a guard interval, and based at least in part on repeating an ending segment of the reference signal sequence as an ending segment in all the data symbols that occur before and after the single reference signal symbol as a guard interval.

In some examples of the method, apparatuses, and non-transitory computer-readable medium described herein, the scheduled transmission formed by the one or more reference signal symbols and the one or more data symbols is formed by a first group of the one or more reference signal symbols and of the one or more data symbols and a second group of the one or more reference signal symbols and of the one or more data symbols.

Some examples of the method, apparatuses, and non-transitory computer-readable medium described herein for generating the waveform may further include operations, features, means, or instructions for generating the waveform by concatenating a first waveform generated for the first group and a second waveform generated for the second group.

Some examples of the method, apparatuses, and non-transitory computer-readable medium described herein for generating the waveform may further include operations, features, means, or instructions for generating the first waveform contained between the beginning boundary and a second ending boundary with a duration equal to a total length of the one or more reference signal symbols and of the one or more data symbols in the first group, and generating the second waveform contained between a second beginning boundary and the ending boundary with a duration equal to a total length of the one or more reference signal symbols and of the one or more data symbols in the second group.

Some examples of the method, apparatuses, and non-transitory computer-readable medium described herein may further include operations, features, means, or instructions for transmitting control information allocating resources for the one or more reference signal symbols and the one or more data symbols.

In some examples of the method, apparatuses, and non-transitory computer-readable medium described herein, the waveform is a discrete Fourier transform spread orthogonal frequency divisional multiplexing (DFT-S-OFDM) waveform or a single carrier quadrature amplitude modulation (QAM) waveform with guard interval.

A method for wireless communications is described. The method may include receiving a waveform formed by one or more reference signal symbols and one or more data symbols, the waveform contained between a beginning boundary and an ending boundary with a duration equal to a total length of the one or more reference signal symbols and the one or more data symbols, performing an FFT on the waveform in symbol length window increments to generate FFT output, and demodulating data from the FFT output.

An apparatus for wireless communications is described. The apparatus may include a processor, memory in electronic communication with the processor, and instructions stored in the memory. The instructions may be executable by the processor to cause the apparatus to receive a waveform formed by one or more reference signal symbols and one or more data symbols, the waveform contained between a beginning boundary and an ending boundary with a duration equal to a total length of the one or more reference signal symbols and the one or more data symbols, perform an FFT on the waveform in symbol length window increments to generate FFT output, and demodulate data from the FFT output.

Another apparatus for wireless communications is described. The apparatus may include means for receiving a waveform formed by one or more reference signal symbols and one or more data symbols, the waveform contained between a beginning boundary and an ending boundary with a duration equal to a total length of the one or more reference signal symbols and the one or more data symbols, performing an FFT on the waveform in symbol length window increments to generate FFT output, and demodulating data from the FFT output.

A non-transitory computer-readable medium storing code for wireless communications is described. The code may include instructions executable by a processor to receive a waveform formed by one or more reference signal symbols and one or more data symbols, the waveform contained between a beginning boundary and an ending boundary with a duration equal to a total length of the one or more reference signal symbols and the one or more data symbols, perform an FFT on the waveform in symbol length window increments to generate FFT output, and demodulate data from the FFT output.

In some examples of the method, apparatuses, and non-transitory computer-readable medium described herein, demodulating the data may include operations, features, means, or instructions for generating a channel estimate based on a subset of the FFT output corresponding to the one or more reference signal symbols, and demodulating the data from the FFT output based on the channel estimate.

Some examples of the method, apparatuses, and non-transitory computer-readable medium described herein may further include operations, features, means, or instructions for shifting a first symbol length window increment of the symbol length window increments corresponding to a reference signal symbol of the one or more reference signal symbols by a length of a beginning segment of a reference signal sequence when first and second reference signal symbols of the one or more reference signal symbols may be adjacent and each includes the reference signal sequence, where the FFT may be performed on the reference signal symbol using the shifted symbol length window increment.

Some examples of the method, apparatuses, and non-transitory computer-readable medium described herein may further include operations, features, means, or instructions for generating a channel estimate based on a subset of the FFT output corresponding to the shifted symbol length window increment, where the data from the FFT output may be demodulated based on the channel estimate.

Some examples of the method, apparatuses, and non-transitory computer-readable medium described herein may further include operations, features, means, or instructions for shifting a first symbol length window increment of the symbol length window increments corresponding to a reference signal symbol of the one or more reference signal symbols by a length of a beginning segment of a reference signal sequence when first and second reference signal symbols of the one or more reference signal symbols may be adjacent.

In some examples of the method, apparatuses, and non-transitory computer-readable medium described herein, a first reference signal segment may be included as a beginning segment in each of the first and second reference signal symbols and a second reference signal segment may be included as an ending segment in each of the first and second reference signal symbols, and different middle reference signal segments may be respectively included as middle segments in each of the first and second reference signal symbols.

In some examples of the method, apparatuses, and non-transitory computer-readable medium described herein, the FFT may be performed on the first reference signal symbol using the shifted symbol length window increment and on the second reference signal symbol using a symbol length window increment aligned with a symbol boundary between the first and second reference signal symbols.

In some examples of the method, apparatuses, and non-transitory computer-readable medium described herein, a beginning segment of a reference signal sequence of a reference signal symbol of the one or more reference signal symbols may be repeated as a beginning segment in each data symbol of the one or more data symbols that occurs prior to the reference signal symbol as guard interval.

Some examples of the method, apparatuses, and non-transitory computer-readable medium described herein may further include operations, features, means, or instructions for shifting each of the symbol length window increments that occur prior to the reference signal symbol by a length of the beginning segment, where the FFT may be performed on a subset of the one or more data symbols that occur prior to the reference signal symbol using a respective shifted symbol length window increment of the shifted symbol length window increments.

In some examples of the method, apparatuses, and non-transitory computer-readable medium described herein, an ending segment of a reference signal sequence of a reference signal symbol of the one or more reference signal symbols may be repeated as an ending segment in each data symbol of the one or more data symbols that occur after the reference signal symbol as guard interval.

Some examples of the method, apparatuses, and non-transitory computer-readable medium described herein may further include operations, features, means, or instructions for aligning each of the symbol length window increments that occur after the reference signal symbol with a symbol period boundary, where the FFT may be performed on each data symbol of the one or more data symbols that occur after the reference signal symbol using the aligned symbol length window increments.

Some examples of the method, apparatuses, and non-transitory computer-readable medium described herein may further include operations, features, means, or instructions for generating a channel estimate from the FFT output corresponding to the reference signal symbol, where the data from the FFT output may be demodulated based on the channel estimate.

In some examples of the method, apparatuses, and non-transitory computer-readable medium described herein, the one or more reference signal symbols may be a single reference signal symbol, and where a beginning segment of a reference signal sequence included in the single reference signal symbol may be repeated as a beginning segment in a data symbol of the one or more data symbols that occurs right after the single reference signal symbol as a guard interval.

Some examples of the method, apparatuses, and non-transitory computer-readable medium described herein may further include operations, features, means, or instructions for shifting a symbol length window increment of the symbol length window increments by a length of the beginning segment, where the FFT may be performed on the single reference signal symbol using the shifted symbol length window increment.

Some examples of the method, apparatuses, and non-transitory computer-readable medium described herein may further include operations, features, means, or instructions for generating a channel estimate corresponding to the single reference signal symbol, where the data from the FFT output may be demodulated based on the channel estimate.

In some examples of the method, apparatuses, and non-transitory computer-readable medium described herein, the one or more reference signal symbols may be a single reference signal symbol, and where a beginning segment of a reference signal sequence included in the single reference signal symbol may be repeated as a beginning segment in a data symbol of the one or more data symbols that occurs right before the single reference signal symbol as a guard interval.

In some examples of the method, apparatuses, and non-transitory computer-readable medium described herein, the FFT may be performed on the single reference signal symbol using a symbol length window increment of the symbol length window increments that may be aligned with a symbol boundary between the single reference signal symbol and the data symbol.

In some examples of the method, apparatuses, and non-transitory computer-readable medium described herein, the one or more reference signal symbols may be a single reference signal symbol, and where a beginning segment of a reference signal sequence included in the single reference signal symbol may be repeated as a beginning segment in all data symbols of the one or more data symbols that occur before and after the single reference signal symbol as a guard interval, and where an ending segment of the reference signal sequence may be repeated as an ending segment in all the data symbols that occur before and after the single reference signal symbol as a guard interval.

In some examples of the method, apparatuses, and non-transitory computer-readable medium described herein, the waveform may be formed by concatenating a first waveform generated for a first group of the one or more reference signal symbols and of the one or more data symbols and a second waveform generated for a second group of the one or more reference signal symbols and of the one or more data symbols.

In some examples of the method, apparatuses, and non-transitory computer-readable medium described herein, the first waveform may be contained between the beginning boundary and a second ending boundary with a duration equal to a total length of the one or more reference signal symbols and of the one or more data symbols in the first group.

In some examples of the method, apparatuses, and non-transitory computer-readable medium described herein, the second waveform may be contained between a second beginning boundary and the ending boundary with a duration equal to a total length of the one or more reference signal symbols and of the one or more data symbols in the second group.

Some examples of the method, apparatuses, and non-transitory computer-readable medium described herein may further include operations, features, means, or instructions for receiving control information allocating resources for the one or more reference signal symbols and the one or more data symbols.

In some examples of the method, apparatuses, and non-transitory computer-readable medium described herein, the waveform may be a DFT-S-OFDM waveform or a single carrier QAM waveform with guard interval.

BRIEF DESCRIPTION OF THE DRAWINGS

FIGS. 8A and 8B illustrate examples of a configuration that supports multi-symbol self-contained waveform design in accordance with aspects of the present disclosure.

DETAILED DESCRIPTION

Generally, the described techniques support generating a waveform (e.g., a DFT-s-OFDM waveform, a quadrature amplitude modulation (QAM) waveform) that may be formed by a combination of reference signal symbols (e.g., demodulation reference signal (DMRS) symbols) or data symbols, or both. The generated waveform may be contained between a beginning boundary and an ending boundary of a slot, and the generated waveform may have a duration equal to a sum length of reference signal symbols and data symbols. In some examples, the generated waveform may include guard intervals (including segments of reference signal sequences), which may be inserted relative to a reference signal symbol or a data symbol, or both. In these examples, the duration of the generated waveform may be equal to a sum of the reference signal symbols, data symbols and corresponding guard intervals. Further the described techniques may enable a user equipment (UE) or base station (e.g., a next-generation NodeB (that may be referred to as a gNB)) to perform a fast Fourier transform (FFT) on the generated waveform for each reference signal symbol and data symbol. The described techniques related to multi-symbol self-contained waveform design may provide advantages, such as uniform FFT windows across a set of symbol periods, which in return may provide further benefits for channel estimation.

Aspects of the disclosure are initially described in the context of a wireless communications system. Various examples of techniques that relate to multi-symbol self-contained waveform design are then described. Aspects of the disclosure are further illustrated by and described with reference to apparatus diagrams, system diagrams, and flowcharts that relate to multi-symbol self-contained waveform design.

Figure 1:
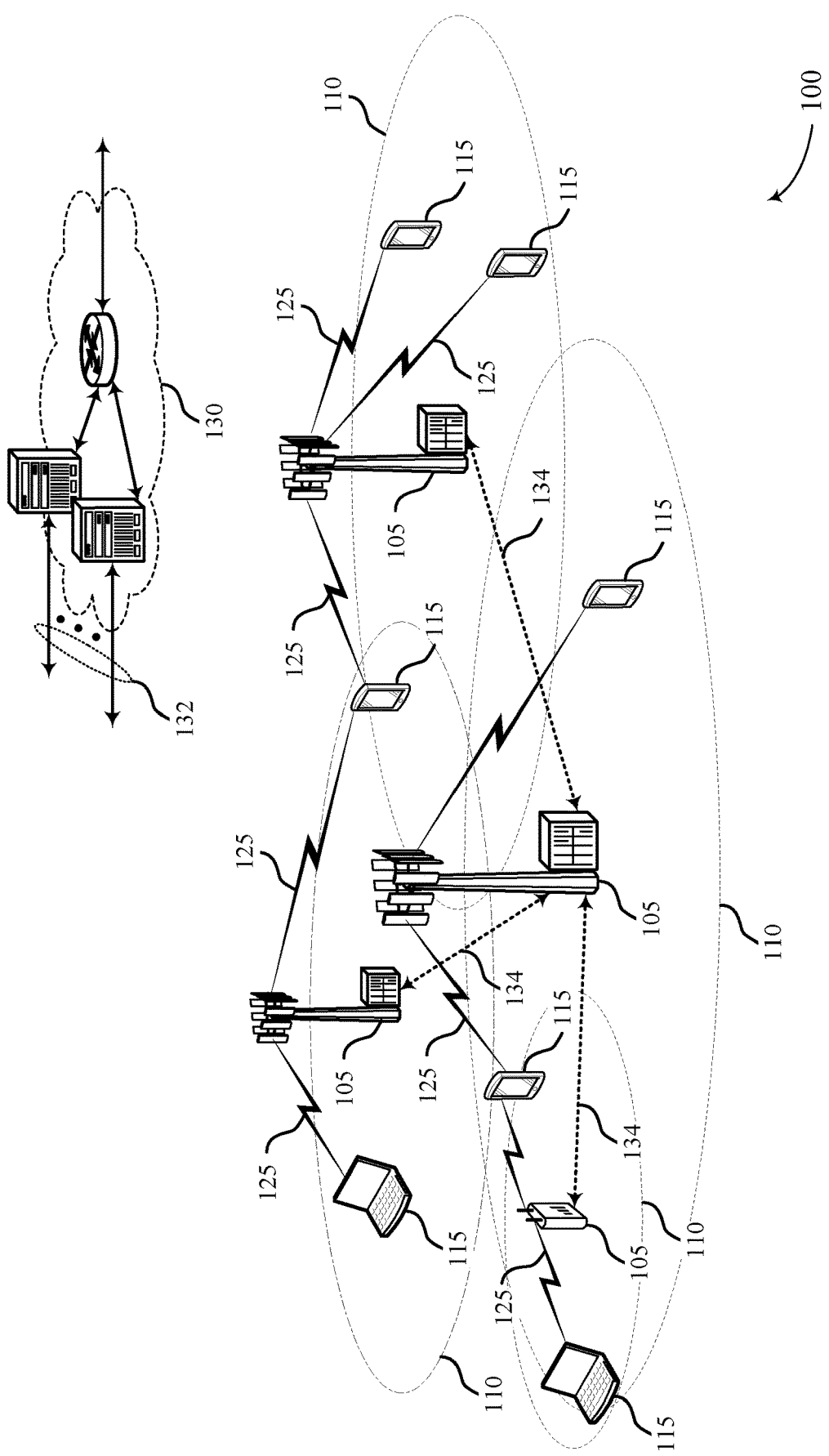
FIGS. 1 and 2 illustrate examples of a wireless communications system that supports multi-symbol self-contained waveform design in accordance with aspects of the present disclosure.

FIG. 1 illustrates an example of a wireless communications system 100 that supports multi-symbol self-contained waveform design in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas.

Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems 100, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples, (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A transmitter device (e.g., base stations 105, UEs 115) may identify that a waveform to be generated for a scheduled transmission is formed by one or more reference signal symbols and one or more data symbols, the waveform to be contained between a beginning boundary and an ending boundary with a duration equal to a total length of the one or more reference signal symbols and the one or more data symbols, generate the waveform by inserting a guard internal in the one or more reference signal symbols and the one or more data symbols to enable a receiver device (e.g., base stations 105, UEs 115) to perform an FFT for each of the one or more reference signal symbols and the one or more data symbols, and transmit the waveform between the beginning boundary and the ending boundary. A receiver device (e.g., base stations 105, UEs 115) may receive the waveform formed by one or more reference signal symbols and one or more data symbols, perform an FFT on the waveform in symbol length window increments to generate FFT output, and demodulate data from the FFT output.

Figure 2:
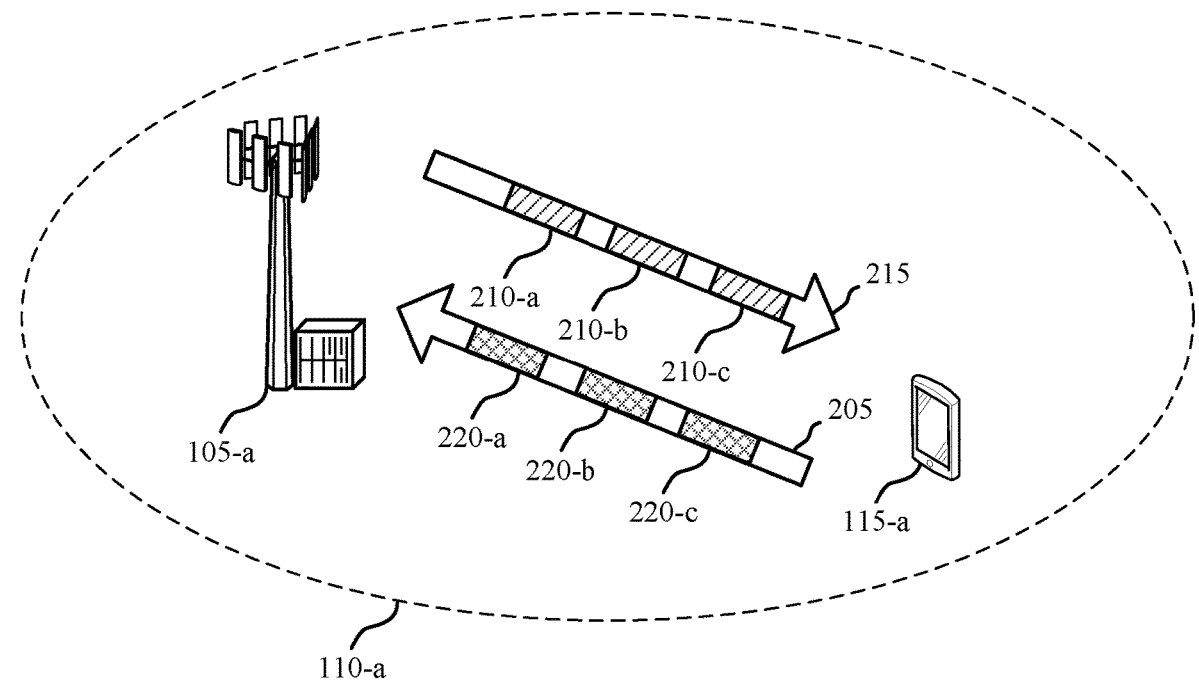

FIG. 2 illustrates an example of a wireless communications system 200 that supports multi-symbol self-contained waveform design in accordance with aspects of the present disclosure. In some examples, wireless communications system 200 may implement aspects of wireless communications system 100. Wireless communications system 200 may include base station 105-a and UE 115-a, which may be examples of corresponding devices described with reference to FIG. 1. Base station 105-a and UE 115-a may support multiple radio access technologies including 4G systems such as LTE systems, LTE-A systems, or LTE-A Pro systems, and 5G systems which may be referred to as NR systems.

Base station 105-a may communicate with UE 115-a over an uplink carrier 205 and a downlink carrier 215. In some examples, base station 105-a may allocate resources (e.g., time and frequency resources) for communication with UE 115-a over uplink carrier 205 and downlink carrier 215, and transmit downlink transmissions 210 via downlink carrier 215 and receive uplink transmissions 220 via uplink carrier 205. Downlink transmissions 210 and uplink transmissions 220 may include data, control, or reference signal transmissions (e.g., demodulation reference signal (DMRS), channel state information reference signal (CSI-RS), sounding reference signal (SRS), phase tracking reference signal (PTRS), and the like), or any combination thereof. In some examples, downlink transmissions 210 may include one or more slots 210-a, 210-b, and 210-c, which may each include a set of symbols (also referred to as modulation symbols (e.g., OFDM symbols)), while uplink transmissions 220 may also include one or more slots 220-a, 220-b, and 220-c, where each may include a set of symbols.

Wireless communications system 200 may in some examples experience a delay spread, which may be based in part on different transmission paths between base station 105-a and UE 115-a when those paths have different delays. For example, a signal (e.g., uplink carrier 205, downlink carrier 215) following a direct line-of-sight path may arrive before a different version of the same signal (e.g., uplink carrier 205, downlink carrier 215), which may be reflected by an obstruction (e.g., a building). Delay spread may, in some examples, be detrimental to wireless communications system 200. For example, delay spread may affect a channel estimation of a channel (e.g., uplink channel, downlink channel) between base station 105-a and UE 115-a. To decrease or eliminate effects of delay spread, base station 105-a and UE 115-b may input cyclic prefixes or guard intervals to a beginning portion of a symbol (e.g., an OFDM symbol), and following the addition of cyclic prefixes or guard intervals base station 105-a and UE 115-b may transmit a waveform (e.g., uplink carrier 205, downlink carrier 215) having a length based on a set of symbols of a slot plus the appended cyclic prefixes or guard intervals. An example of symbol and slot designs using cyclic prefixes and guard intervals are illustrated in FIGS. 3A and 3B, and will be discussed in more detail below.

Figure 3A:
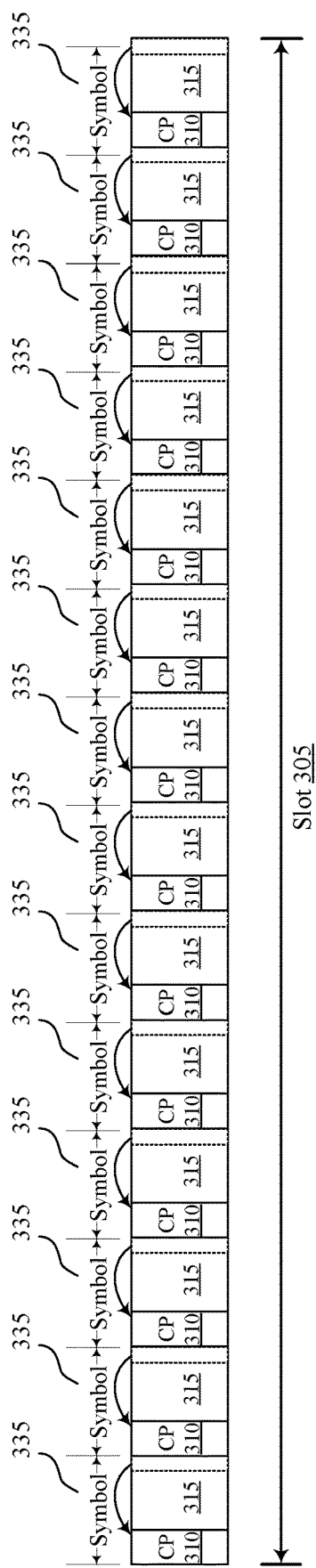
FIGS. 3A and 3B illustrate examples of a configuration that support a slot structure design using cyclic prefixes and guard intervals in accordance with aspects of the present disclosure.
Figure 3B:
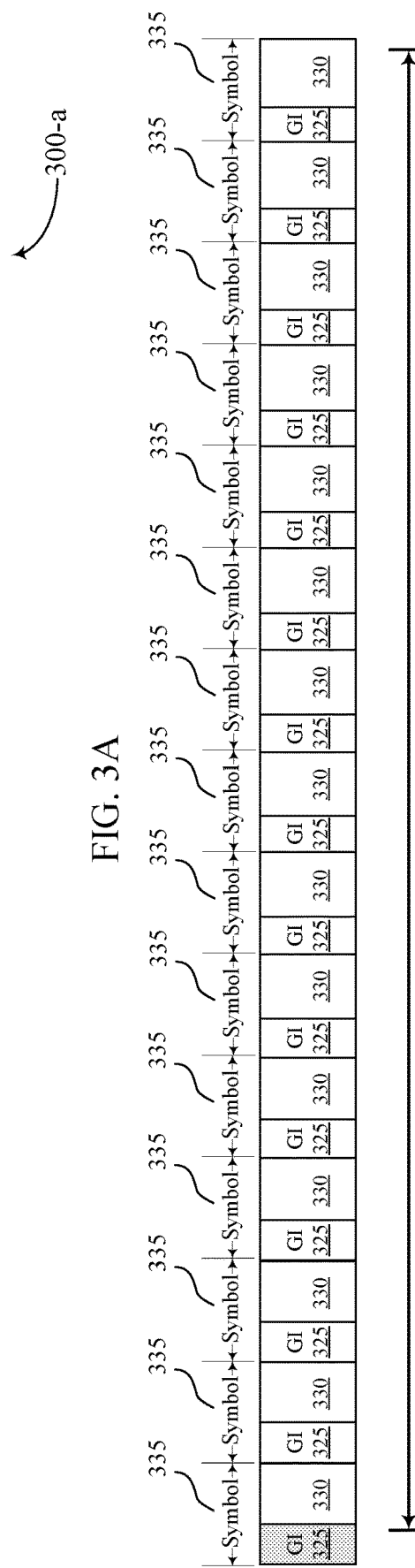

FIG. 3A illustrates an example of a configuration 300-a that supports a slot structure design using cyclic prefixes and guard intervals in accordance with aspects of the present disclosure. With reference to FIG. 2, base station 105-a and UE 115-b may support configuration 300-a. In the example of FIG. 3A, configuration 300-a may include a slot 305, which may include a set of symbols 335, for example, 14 modulation symbols. Here, slot 305 may have a legacy-based design (e.g., 4G systems such as LTE systems, LTE-A systems, or LTE-A Pro systems)—a transmission time interval (e.g., a slot) that is segmented into multiple symbols. In some examples, an NR-based design (e.g., 5G systems) may have a slot structure design similar to this—a slot having 14 symbols. Each symbol 335 in slot 305 may have a cyclic prefix 310 appended to it. For example, base station 105-a and UE 115-b may append cyclic prefixes 310 to a beginning portion of each symbol 335 in slot 305 by copying (repeating) an ending portion of a symbol 335 to a beginning portion of the symbol 335. A length of cyclic prefix 310 may be set to fit a duration of slot 305. Each symbol 335 in slot 305 may therefore contain a cyclic prefix 310 and a data symbol period 315.

Configuration 300-a may additionally, or alternatively, use non-even cyclic prefixes with extra cyclic prefixes for symbols including reference signals (e.g., DMRS, PTRS) and less (or none) for symbols carrying data. Base station 105-a and UE 115-b may then process the set of symbols 335 in slot 305 following the addition of cyclic prefixes 310.

By way of example, as part of the processing, base station 105-a and UE 115-b may generate a waveform (e.g., a cyclic prefix Orthogonal Frequency Division Multiplexing (CP-OFDM) waveform, a DFT-s-OFDM waveform) for channel estimation, such that base station 105-a and UE 115-b may perform an FFT on the waveform during an FFT window that may have a length that corresponds to a total of each length of the symbols 335 (e.g., cyclic prefixes 310 plus data symbol periods 315). By appending cyclic prefixes 310 to each symbol 335, base station 105-a and UE 115-b may manage (e.g., reduce or eliminate) delay spread, while also containing a waveform for channel estimation within slot 305. However, the waveform length may be a summation of each length of the symbols 335 (e.g., cyclic prefixes 310 plus data symbol periods 315), which may impose added use of resources for base station 105-a or UE 115-a, or both.

FIG. 3B illustrates and example of a configuration 300-b that supports a slot structure design using cyclic prefixes and guard intervals in accordance with aspects of the present disclosure. With reference to FIG. 2, base station 105-a and UE 115-b may support configuration 300-b. In the example of FIG. 3B, configuration 300-b may include a slot 320, which may include a set of symbols 335—15 modulation symbols. For example, when base station 105-a and UE 115-b determine to use guard intervals 325 over cyclic prefixes, slot 320 may include more symbols 335 per slot (e.g., 15 modulation symbols). Each symbol 335 in slot 320 may have a guard interval 325 inserted to a beginning portion of each symbol 335. In some examples, guard intervals 325 may function similar to cyclic prefixes, for example, guard intervals may also be a repetition of a fraction of an ending portion of each corresponding symbol 335. Otherwise, guard intervals 325 may be a set duration where no transmission occurs. Each symbol 335 in slot 320 may therefore contain a guard interval 325 and a data symbol period 330 (e.g., carrying data).

In some examples, a guard interval 325 may extend outside slot 320. For example, when using guard intervals 325, to reduce or eliminate delay spread, a first guard interval 325 of a first symbol 335 in slot 320 may exceed a boundary of slot 320. Base station 105-a and UE 115-b may address this extension by adjusting a duration of guard intervals 325. For example, each guard interval 325 may be within each symbol 335 and may be variable in length, such that a waveform associated with the symbols 335 of slot 320 can be contained within the slot 320. Base station 105-a and UE 115-b may then process the set of symbols 335 in slot 305 following the insertion of guard intervals 325.

By way of example, as part of the processing, base station 105-a and UE 115-b may generate waveforms (e.g., GI-OFDM waveforms, GI-DFT-S-OFDM waveforms) for channel estimation, such that base station 105-a and UE 115-b may perform an FFT on the waveform during an FFT window that may have a length that corresponds to a sum of each length of the symbols 335 (e.g., guard intervals 325 plus data symbols 330). In the example of FIG. 3B, the length of the waveform may include an additional length related to a first guard interval 325 of a first symbol 335 of slot 320. Therefore, inserting guard intervals 325 to each symbol 335, base station 105-a and UE 115-b may control (e.g., reduce or eliminate) delay spread, while also containing a waveform for channel estimation within slot 320. However, the GI-OFDM waveforms, GI-DFT-S-OFDM waveforms length may be a sum of each length of the symbols 335 (e.g., guard intervals 325 plus data symbols 330, which may impose added use of resources for base station 105-a and UE 115-a both compared to CP-OFDM waveforms. This may also effect FFT window lengths for base station 105-a and UE 115-a when performing FFT of a waveform for channel estimation.

Returning to FIG. 2, in some examples of a nonfull slot assignment, it may be desirable for base station 105-a and UE 115-a to generate a waveform that may occupy only an assigned set of symbols of a slot, and not extend to any previous symbols. An example of slot structure designs supporting guard interval insertion for a self-contained waveform are illustrated in FIGS. 4A and 4B, and will be discussed in more detail below.

Figure 4A:
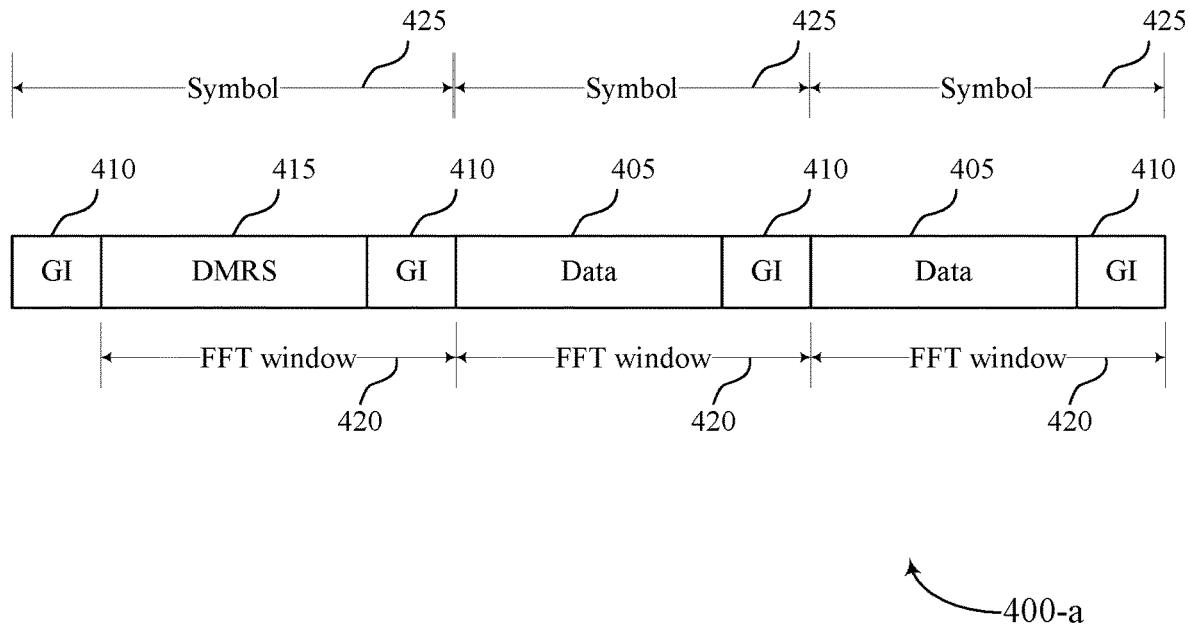
FIGS. 4A and 4B illustrate examples of a configuration that support guard interval insertion for a self-contained waveform design in accordance with aspects of the present disclosure.
Figure 4B:
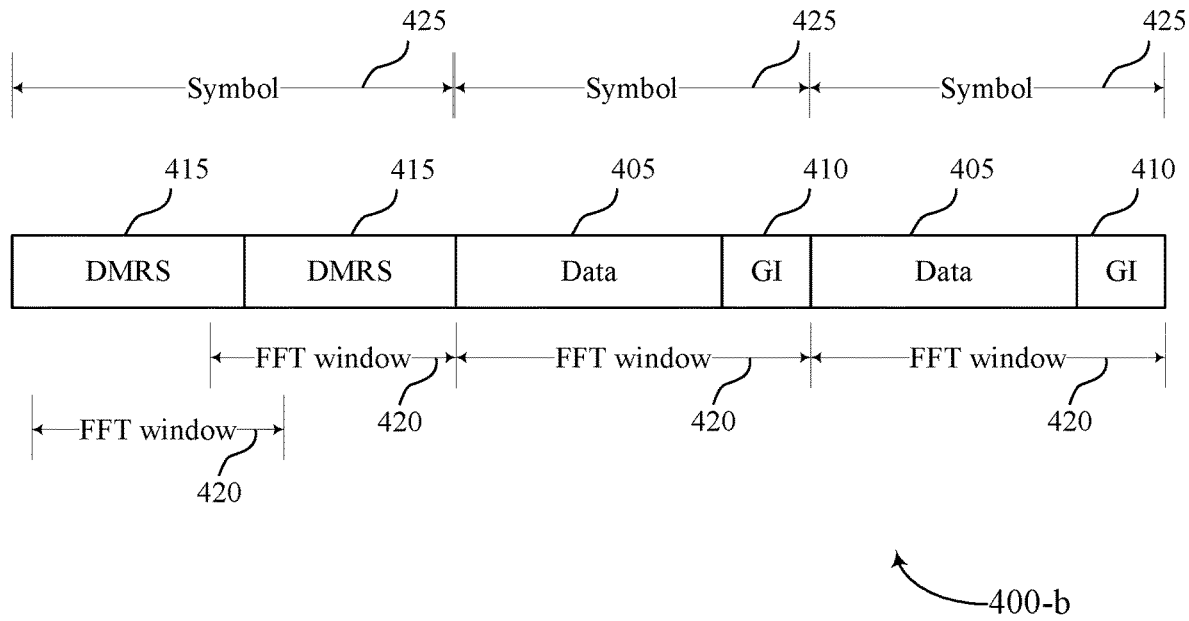

FIG. 4A illustrates an example of a configuration 400-a that supports guard interval insertion for a self-contained waveform design in accordance with aspects of the present disclosure. With reference to FIG. 2, base station 105-a and UE 115-b may support configuration 400-a, which may include a set of symbols 425 associated with a slot. In the example of FIG. 4A, a slot (or a portion of a slot) may include a set of symbols 425, which may include data symbol periods 405 or reference signal symbol periods 415 (e.g., DMRS symbol periods), or a combination thereof. Base station 105-a and UE 115-a may use reference signal symbol periods 415 (e.g., DMRS symbol periods) for physical downlink shared channel (PDSCH) and physical uplink shared channel (PUSCH) transmissions. In some examples, reference signal symbol periods 415 (e.g., DMRS symbol periods) may span an entire length of a symbol 425, due to single carrier waveform characteristics.

Each symbol 425 of the set may have a guard interval 410 appended to a beginning portion of each symbol 425 or an ending portion of each symbol 425. In the example of FIG. 4A, a guard interval 410 may be prepended ahead of a first reference signal symbol period 415 (e.g., DMRS symbol period). That is, base station 105-a and UE 115-a may absorb a guard interval 410 into a first symbol 425 (e.g., including a reference signal symbol period (e.g., DMRS symbol period)) in a slot. By absorbing guard interval 410 into a first symbol 425, when base station 105-a and UE 115-a perform an FFT within an FFT window 420, the FFT window 420 associated with the first symbol 425 may be smaller than other FFT windows 420 related to succeeding symbols 425. In such cases, a first symbol 425 that has a smaller FFT window 420 length, may also have a reduced FFT window 420 length for channel estimation.

In some examples, a reference signal (e.g., DMRS) of a first reference signal symbol period 415 of a first symbol 425 of a slot may be reduced in length, such that guard interval 410 prepended ahead of the first reference signal symbol period 415 and a guard interval 410 appended at an ending portion of the first reference signal symbol period 415 may fit within a length of the first symbol 425. By providing the reduced length reference signal symbol period (e.g., DMRS symbol period), symbols 425 within a same slot may be self-contained, and thus amenable to continuous transmission with other transmission slots. However, configuring different lengths of FFT windows 420 to perform FFTs on symbols having an extra guard interval and switching between varying FFT window lengths may be complex and resource extensive for base station 105-a and UE 115-a.

FIG. 4B illustrates an example of a configuration 400-b that supports guard interval insertion for a self-contained waveform design in accordance with aspects of the present disclosure. With reference to FIG. 2, base station 105-a and UE 115-b may support configuration 400-b, which may include a set of symbols 425 of a slot. A slot (or a portion of a slot) may include a set of symbols 425, which may include data symbol periods 405 or reference signal symbol periods 415 (e.g., DMRS symbol periods), or a combination thereof. Data symbol periods 405 may have a guard interval 410 appended to a beginning portion of each corresponding symbol 425 or an ending portion of each corresponding symbol 425. In some examples, base station 105-*a* and UE 115-*a* may transmit reference signal symbol period 415 that may have a reduced length. In the example of FIG. 4B, a reference signal symbol period 415 having a reduced length may be a halved DMRS symbol period. A halved DMRS symbol period may be repeated within a symbol 425. For example, a first symbol 425 may include two reduced reference signal symbol periods 415 (e.g., two halved DMRS symbol periods).

When base station 105-*a* and UE 115-*a* perform an FFT associated with the first symbol 425—including two reference signal symbol periods 415 (e.g., halved DMRS symbol periods)—base station 105-*a* and UE 115-*a* may use a reduced FFT window length. For example, base station 105-*a* and UE 115-*a* may use half a length of an FFT window 420 for the two reference signal symbol periods 415 (e.g., halved DMRS symbol periods). In the example of FIG. 4B, a first half FFT window 420 may be shifted, so a beginning portion of a first reference signal symbol period 415 (e.g., DMRS symbol period) may be used as a cyclic prefix. When performing channel estimation, base station 105-*a* and UE 115-*a* may for each reference signal symbol period 415 (e.g., formed by two repetitions of a half-length reference signal sequences (e.g., DMRS sequences)) perform two half-length FFTs for channel estimation and combine the outcome. Thus, FFT windows 420 associated with the first symbol 425 may be smaller than other FFT windows 420 related to symbols 425 including data symbol periods 405. In the example of FIG. 4B, base station 105-*a* and UE 115-*a* may switch between half-length FFT windows and full-length FFT windows dynamically. Dynamically switching between different lengths of FFT windows 420 may be complex and resource extensive for base station 105-*a* and UE 115-*a*. By providing reduced length reference signal symbol periods 415, all symbols 425 may be self-contained. Nevertheless, configuring different lengths for FFT windows 420 may be complex and resource extensive for base station 105-*a* and UE 115-*a*.

Returning to FIG. 2, base station 105-*a* and UE 115-*b* may support a multi-symbol self-contained waveform design, in which FFT windows have an equal length for each symbol of a slot. To attain this, a waveform may be contained between a beginning boundary and an ending boundary of a set of symbols to enable base station 105-*a* and UE 115-*b* to perform an FFT on the waveform in symbol length window increments corresponding to each symbol of the set of symbols. In other words, base station 105-*b* and UE 115-*b* may support a waveform that has a total length that may be a sum of each symbol length. As a result, the improved waveform overcomes shortcoming of previous waveform designs (e.g., CP-OFDM waveforms), where a total length may be a sum of each symbol, which may include a cyclic prefix plus data or control portion of each symbol itself. In addition, the improved waveform overcomes shortcoming of previous guard interval insertion-based waveforms, where a total length of the waveform may be a sum of all symbols plus guard intervals associated with the symbols. An example of various configurations that support a multi-symbol self-contained waveform are illustrated in FIGS. 5 through 10, and will be discussed in more detail below.

Figure 5:
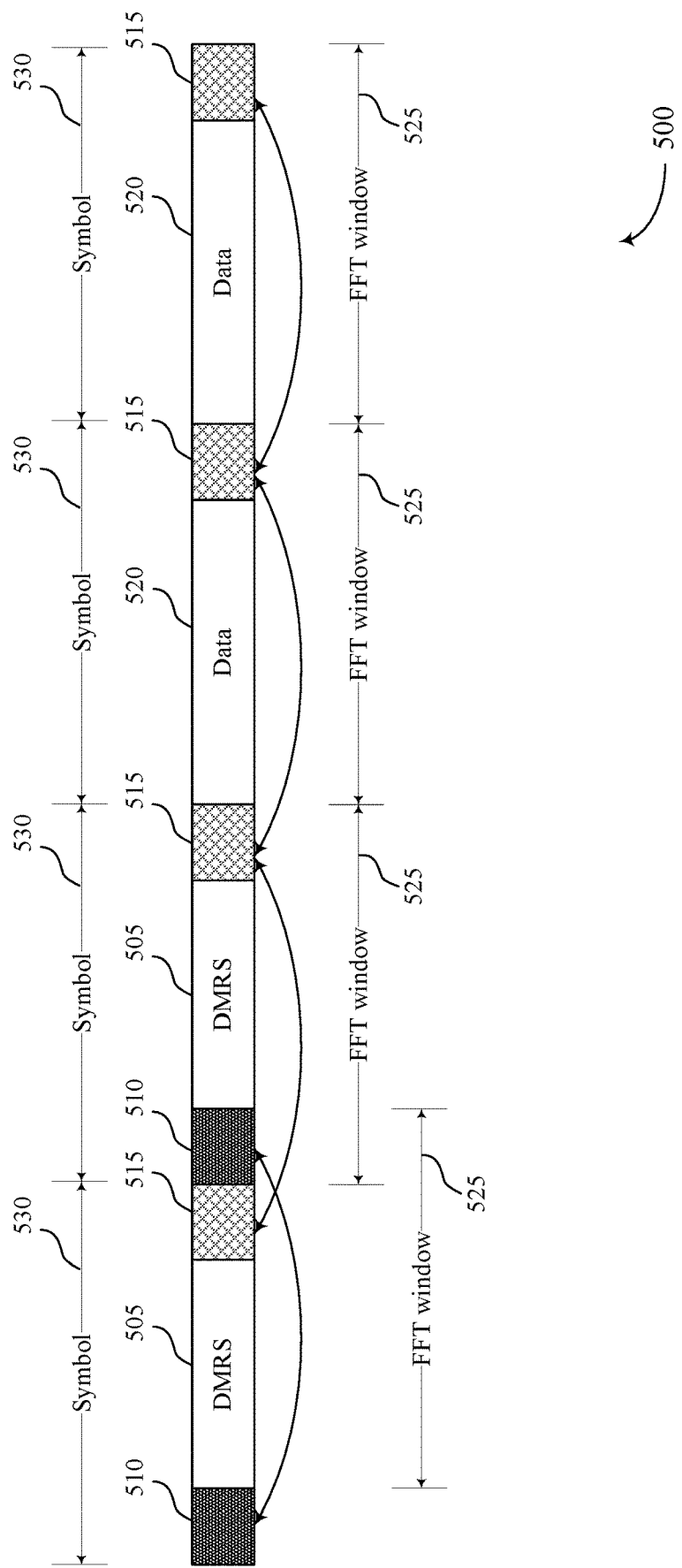
FIGS. 5 through 7 illustrate examples of a configuration that supports multi-symbol self-contained waveform design in accordance with aspects of the present disclosure.

FIG. 5 illustrates an example of a configuration 500 that supports multi-symbol self-contained waveform design in accordance with aspects of the present disclosure. With reference to FIG. 2, base station 105-*a* and UE 115-*b* may support configuration 500, which may include a set of symbols 530 of a slot. Base station 105-*a* and UE 115-*a* may generate a waveform that is self-contained across the set of symbols 530 according to configuration 500. A slot may include a set of symbols 530, which may include reference signal symbol periods 505 (e.g., DMRS symbol periods) or data symbol periods 520, or a combination thereof. In the example of FIG. 5, instead of using reduced length reference signal symbol periods (e.g., half-length reference signal sequences like in FIG. 4C), configuration 500 may support repeating reference signal sequences at a symbol period level. For example, base station 105-*a* and UE 115-*a* may repeat an ending of a reference signal sequence 515 associated with a reference signal symbol period 505 to an ending portion of each symbol 530 associated with data symbol period 520. Here, base station 105-*a* and UE 115-*a* may generate a waveform using a same reference signal sequence in a pair of adjacent reference signal symbol periods 505 of symbols 530.

As illustrated in FIG. 5, an ending segment of a reference signal sequence 515 associated with a first reference signal symbol period 505 of a first symbol 530 may be appended (e.g., copied, repeated) to an ending portion of each subsequent symbol 530 that has data symbol period 520. For these subsequent symbols 530, the appended (e.g., repeated) ending of the reference signal sequence 515 may function as a guard interval. When base station 105-*a* and UE 115-*a* perform an FFT on symbols 530 (e.g., reference signal symbol periods 505 (e.g., DMRS symbol periods) or data symbol periods 520, or a combination thereof), an FFT window 525 of a first symbol 530 (e.g., including a first reference signal symbol period 505 (e.g., a first DMRS symbol period)) may be shifted, and a beginning portion 510 (e.g., a beginning segment of a reference signal sequence) of the first symbol 530 may function as a guard interval.

The FFT window 525 of the first symbol 530 may crossover into a second symbol 530. For example, FFT window 525 may end at the guard interval (e.g., copied beginning portion of the reference signal sequence 510 associated with the second symbol 530. Meanwhile, remaining FFT windows 525 associated with the subsequent symbols 530 including second reference signal symbol period 505 or data symbol periods 520, or a combination thereof may be aligned with the symbols 530 and not cross over into other symbols 530. In the example of FIG. 5, each of FFT windows 525 may therefore have a uniform length across all symbols 530. Additionally, base station 105-*a* and UE 115-*a* may mange delay spread without appending cyclic prefixes or guard intervals to symbols.

Given the above explanation, at a receiver device (e.g., base station 105-*a*, UE 115-*b*), an FFT on the waveform may be performed in symbol length window increments (e.g., FFT windows 525) to generate an FFT output, and demodulate data from the FFT output. In some examples, the receiver device may shift a first symbol length window increment (e.g., a first FFT window 525) of the symbol 535 by a length of a beginning segment of a reference signal sequence (e.g., beginning portion of the reference signal sequence 510), and generate a channel estimate based on a subset of the FFT output corresponding to the shifted symbol length window. Accordingly, configuration 500 may support generating and processing a waveform that is self-contained across all symbols with equal length FFT windows 525 across all symbols.

Figure 6:
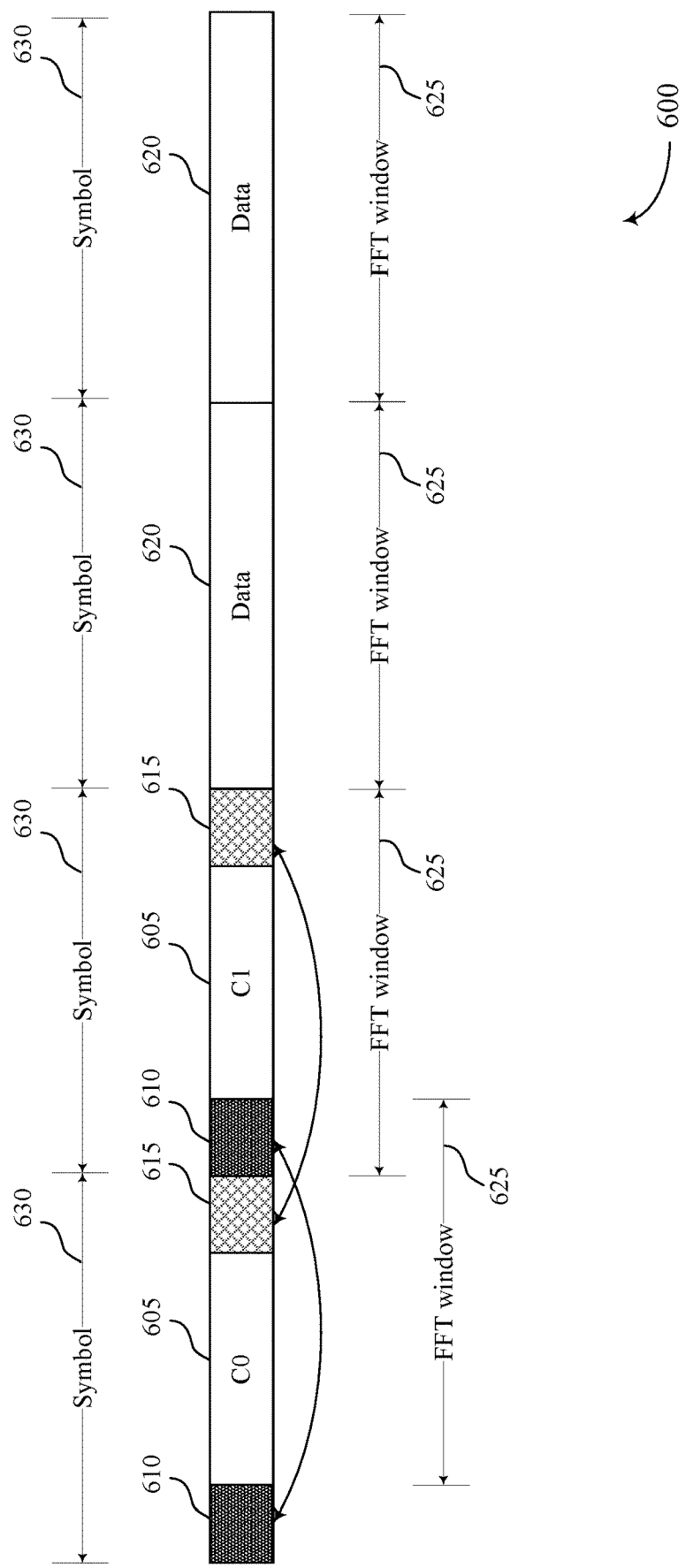

FIG. 6 illustrates an example of a configuration 600 that supports multi-symbol self-contained waveform design in accordance with aspects of the present disclosure. With reference to FIG. 2, base station 105-*a* and UE 115-*b* may support configuration 600, which may include a set of symbols 630 of a slot. Base station 105-*a* and UE 115-*a* may generate a waveform that is self-contained across the set of symbols 630 according to configuration 600. A slot may include a set of symbols 630, which may include reference signal symbol periods 605 or data symbol periods 620, or a combination thereof. In NR-based slot structure design (e.g., 5G systems), DMRS sequence scrambling may be per symbol. In the example of FIG. 6, configuration 600 may avoid DMRS sequence repetition in multiple symbols (e.g., like in FIG. 5), due to DMRS sequence scrambling being per symbol, which may impose added overhead to base station 105-*a* and UE 115-*a*.

A symbol 630 may be made up of one or more elements. For example, a reference signal symbol period, in FIG. 6, may have two elements including a beginning portion 610 and ending portion 615 associated with a reference signal sequence (e.g., DMRS sequence), both which may be common across all continuous symbols 630. Additionally, a reference signal symbol period 605 may include a middle control portion (e.g., C0, C1), which may be a reference signal symbol period 605. In some examples, a middle control portion C1 of a symbol 630 may be a reference signal symbol period 605 that may vary in context of the reference signal carried.

In view of configuration 600, base station 105-*a* may generate a waveform based on a first reference signal sequence (e.g., a DMRS sequence) in a first symbol 630 differing from a second reference signal sequence (e.g., PTRS sequence) included in a second symbol 630. For example, base station 105-*a* and UE 115-*a* may generate a waveform when a first symbol 630 and a second symbol 630 are adjacent and have different reference signal symbol periods 605 (e.g., middle control portion C1). Here, a first reference signal sequence segment may be included at a beginning (e.g., a beginning portion 610) of both the first and the second symbols 630, as well as a second reference signal sequence segment may be included at an end (e.g., an ending portion 615) of both the first and the second symbols 630, while the middle segments of the first and the second symbols 630 remain different. Thus, base station 105-*a* and UE 115-*a* may generate a waveform when first and second reference signal symbols are adjacent, based on including a first reference signal segment as a beginning segment in each of the first and second reference signal symbols and a second reference signal segment as an ending segment of each of the first and second reference signal symbols.

The FFT window 625 of the first symbol 630 may crossover into a second symbol 630. For example, FFT window 625 may end at the copied beginning portion 610 of the reference signal sequence associated with the second symbol 630. Meanwhile, remaining FFT windows 625 associated with the subsequent symbols 630 including data symbol periods 620 may be aligned with the symbols 630 and not cross over into other symbols 630. In the example of FIG. 6, FFT windows 625 may therefore have a uniform length across all symbols 630. Additionally, base station 105-*a* and UE 115-*a* may mange delay spread without appending cyclic prefixes or guard intervals to symbol.

Given the above explanation, at a receiver device (e.g., base station 105-*a*, UE 115-*b*), an FFT on the waveform may be performed in symbol length window increments (e.g., FFT windows 625) to generate an FFT output, and demodulate data from the FFT output. In some examples, the receiver device may shift a first symbol length window increment (of a first FFT window 625) by a length of a beginning portion 610 of the reference signal sequence when first and second reference signal symbols of the first and second symbols 630 are adjacent. Here the FFT may be performed on the first reference signal symbol period (e.g., symbol 630 that includes middle control portion C0) using the shifted symbol length window increment (e.g., includes middle portion C0, ending portion 615, and beginning portion 610 of the second symbol 630 within the shifted symbol length window increment) and on the second reference signal symbol (e.g., symbol 630 that includes middle control portion C1) using a symbol length window increment aligned with a symbol boundary between the first and second symbols 630 (e.g., the aligned symbol length window increment encompasses beginning portion 610 of the second symbol 630, middle portion C1, and ending portion 615 of the second symbol 630). Hence, configuration 600 may support generating and processing a waveform that is self-contained across all symbols with equal length FFT windows 625 across all symbols.

Figure 7:
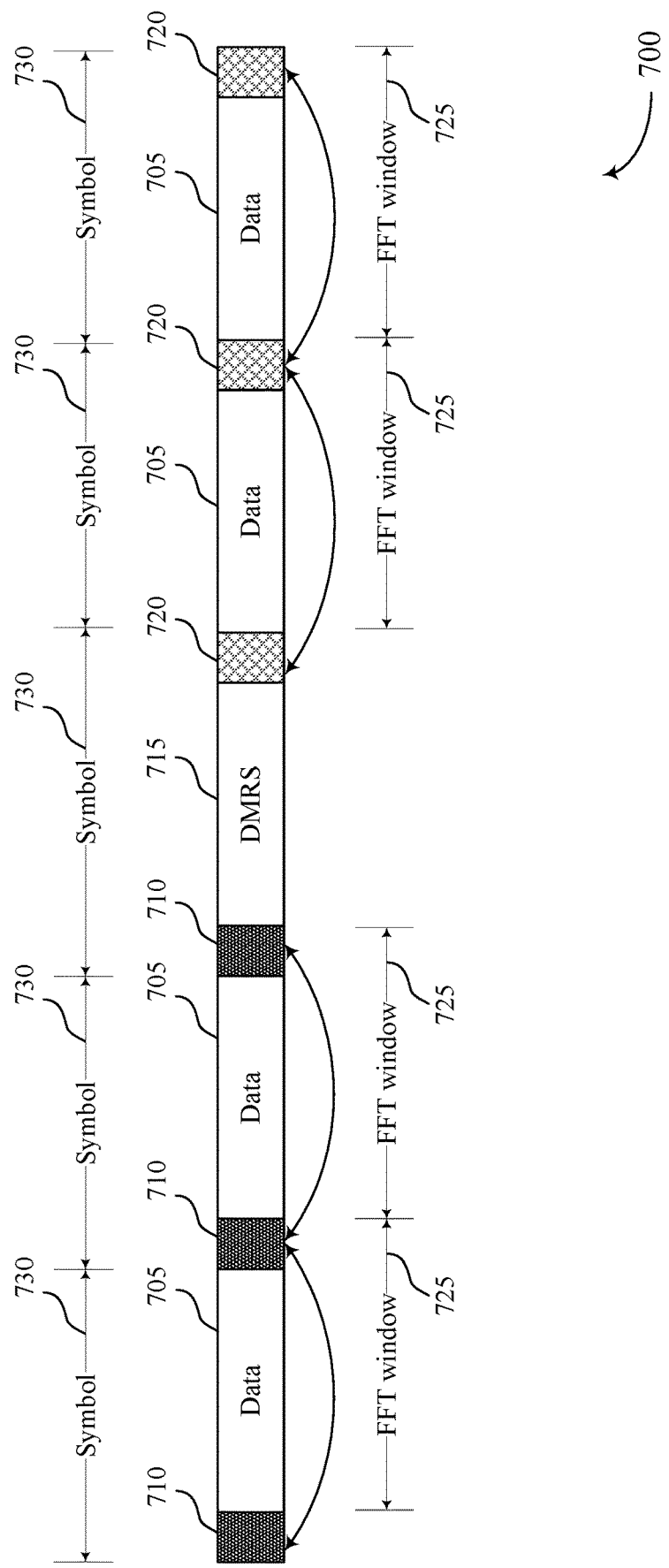

FIG. 7 illustrates an example of a configuration 700 that supports multi-symbol self-contained waveform design in accordance with aspects of the present disclosure. With reference to FIG. 2, base station 105-*a* and UE 115-*b* may support configuration 700, which may include a set of symbol periods 730 of a slot. Base station 105-*a* and UE 115-*a* may generate a waveform that is self-contained across the set of symbols 730 according to configuration 700. A slot may include a set of symbols 730, which may include data symbol periods 705 or reference signal symbol periods 715 or, or a combination thereof.

In some examples, base station 105-*a* and UE 115—may generate a waveform when a data symbol occurs right after a reference signal symbol, based on repeating an ending segment of a reference signal sequence of the reference signal symbol as an ending segment in the data symbol as guard interval. For example, for data symbol periods 705 following (e.g., occurring after) a reference signal symbol period 715, an ending portion 720 (e.g., a reference signal sequence segment) may be copied to (and repeated to) an ending portion of the data symbol periods 705. This may serve as a guard interval for the symbols 730. Additionally, for data symbol periods 705 subsequent to reference signal symbol period 715, FFT windows 725 may align with the symbol 730 boundaries.

In some examples, base station 105-*a* and UE 115-*a* may generate the waveform when a data symbol occurs prior to a reference signal symbol, based on repeating a beginning segment of a reference signal sequence of the reference signal symbol as a beginning segment in the data symbol as a guard interval. For example, for data symbol periods 705 occurring before reference signal symbol period 715, a beginning portion 710 (e.g., a reference signal sequence segment) may be copied to (and repeated to) a beginning portion of the data symbol periods 705. The copied reference signal sequence segment may function as a guard interval for the symbols 730. For data symbol periods 705 preceding reference signal symbol period 715, FFT windows 725 may be shifted to begin after the copied beginning portion 710 (e.g., copied reference signal sequence segment) in the symbol 730 and end after the copied beginning portion 710 (e.g., copied reference signal sequence segment) in a subsequent symbol 730. For example, a first FFT window 725 may being after a first copied beginning portion 710 (e.g., copied reference signal sequence segment) and end after a second copied beginning portion 710 (e.g., copied reference signal sequence segment).

Returning to FIG. 2, in some examples, repetition of reference signal sequences (e.g., either half-length or full-length DMRS sequences) may be used to create some cyclic structure for FFT operation. However, repetition of reference signal sequences may result in energy on even tones only, which may violate power spectral density (PSD) restrictions for base station 105-*a* and UE 115-*a*. Additionally, half-length reference signal sequence repetition may necessitate half-length FFT windows, which may impose added complexity to base station 105-*a* and UE 115-*a*. To avoid reference signal sequence repetition, base station 105-*a* and UE 115-*a* may use additional guard intervals for reference signal sequences (e.g., DMRS). An example of slot structure designs using additional guard intervals for reference signal sequences and supporting multi-symbol self-contained waveform design are illustrated in FIGS. 8A and 8B, and will be discussed in more detail below.

FIG. 8A illustrates an example of a configuration 800-*a* that supports multi-symbol self-contained waveform design in accordance with aspects of the present disclosure. With reference to FIG. 2, base station 105-*a* and UE 115-*b* may support configuration 800-*a*, which may include a set of symbols 830 of a slot. Base station 105-*a* and UE 115-*a* may generate a waveform that is self-contained across the set of symbols 830 according to configuration 800-*a*. The set of symbols 830 may include data symbol periods 805 or reference signal symbol periods 815 or, or a combination thereof. The set of symbols 830 may have equal lengths. In the example of FIG. 8A, if there is a symbol 830 including data symbol period 805 that is succeeding another symbol 830 including a reference signal symbol period 815, a guard interval may be appended to a beginning portion of that symbol 830 (e.g., including the data symbol period 805). The guard interval may be a copied segment of a beginning portion 810 of a reference signal sequence. The copied reference signal sequence segment may therefore function as a guard interval for the symbols 830 (e.g., data symbol period 805). Here, the symbols 830 may also include two guard intervals, for example, at a beginning and an ending of the symbols 830. When base station 105-*a* and UE 115-*a* perform an FFT on reference signal symbol periods 815 (e.g., DMRS symbol periods), the shifted FFT window 825 of the reference signal symbol periods 815 may be used for channel estimation (e.g., DMRS channel estimation).

Configuration 800-*a* may generate a waveform when a single reference signal symbol with a data symbol occurs right after the single reference signal symbol. The generation may be based on repeating a beginning segment of a reference signal sequence included in the single reference signal symbol as a beginning segment in the data symbol as a guard interval. For example, base station 105-*a* and UE 115-*b* may generate a waveform by repeating a beginning segment of a reference signal sequence included in a single reference signal symbol period (e.g., reference signal symbol period 815) as a beginning segment in all data symbol periods 805 that occur before and after the single reference signal symbol period as a guard interval. Additionally, or alternatively, base station 105-*a* and UE 115-*b* may generate a waveform when a single reference signal symbol (e.g., reference signal symbol period 815) with a data symbol period 805 occurs right after the single reference signal symbol, based on repeating a beginning segment of a reference signal sequence included in the single reference signal symbol as a beginning segment in the data symbol period 805 as a guard interval. Additionally, or alternatively, base station 105-*a* and UE 115-*b* may generate a waveform when a data symbol period 805 occurs right before the single reference signal symbol, based on repeating an ending segment of a reference signal sequence included in the single reference signal symbol as an ending segment in the data symbol as a guard interval.

FIG. 8B illustrates an example of a configuration 800-*b* that supports multi-symbol self-contained waveform design in accordance with aspects of the present disclosure. With reference to FIG. 2, base station 105-*a* and UE 115-*b* may support configuration 800-*b*, which may include a set of symbol periods 830 of a slot. Base station 105-*a* and UE 115-*a* may generate a waveform that is self-contained across the set of symbols 830 according to configuration 800-*b*. A slot may include a set of symbols 830, which may include data symbol periods 805 or reference signal symbol periods 815 or, or a combination thereof. The set of symbols 830 may have equal lengths. In the example of FIG. 8B, if there is a symbol 830 including data symbol period 805 that is preceding another symbol 830 including a reference signal symbol period 815, a guard interval may be appended to a beginning portion of this symbol 830. The guard interval may be a copied segment of a beginning portion 810 of a reference signal sequence. The copied reference signal sequence segment may therefore function as a guard interval for the symbols 830 (e.g., data symbol periods 805). Here, the symbols 830 may also include two guard intervals, for example, at a beginning and an ending of the symbols 830. When base station 105-*a* and UE 115-*a* perform an FFT on reference signal symbol periods 815 (e.g., DMRS symbol periods), an FFT window 825 of the reference signal symbol period 815 may be aligned with the boundaries of the symbols 830 and may be used for channel estimation (e.g., DMRS channel estimation) for demodulating the data symbols 830. In some examples, when the reference signal symbol 815 is in the middle of a set of symbols (e.g., at least one data symbol on either side of symbol 815), one of configuration 800-*a* or 800-*b* may be applied.

Accordingly, configuration 800-*b* may generate a waveform when a single reference signal symbol with a data symbol occurs right before the single reference signal symbol. The generation may be based on repeating a beginning segment of a reference signal sequence included in the single reference signal symbol as a beginning segment in the data symbol as a guard interval. For example, base station 105-*a* and UE 115-*b* may generate a waveform by repeating a beginning segment of a reference signal sequence included in a single reference signal symbol period (e.g., reference signal symbol period 815) as a beginning segment in all data symbol periods 805 that occur before and after the single reference signal symbol period as a guard interval. Additionally, or alternatively, base station 105-*a* and UE 115-*b* may generate a waveform when a single reference signal symbol (e.g., reference signal symbol period 815) with a data symbol period 805 occurs right after the single reference signal symbol, based on repeating a beginning segment of a reference signal sequence included in the single reference signal symbol as a beginning segment in the data symbol period 805 as a guard interval. Additionally, or alternatively, base station 105-*a* and UE 115-*b* may generate a waveform when a data symbol period 805 occurs right before the single reference signal symbol, based on repeating an ending segment of a reference signal sequence included in the single reference signal symbol as an ending segment in the data symbol as a guard interval.

Figure 9:
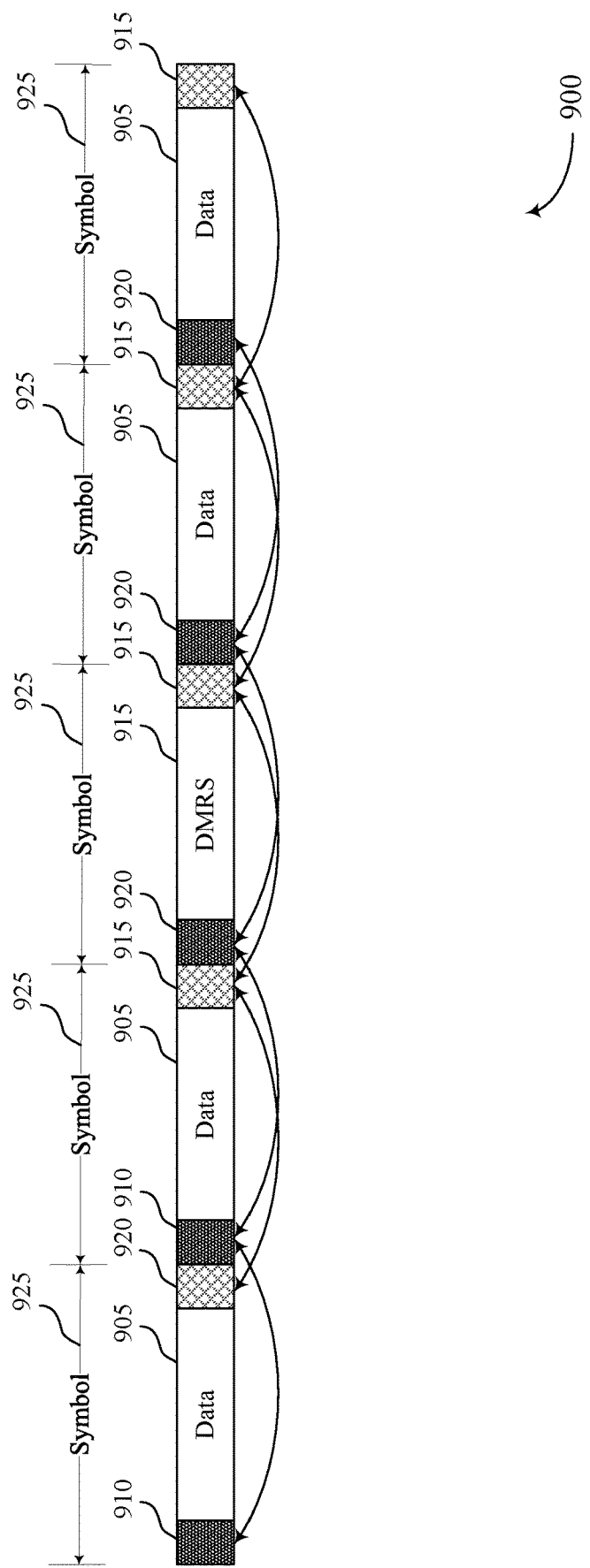
FIGS. 9 and 10 illustrate examples of a configuration that supports multi-symbol self-contained waveform design in accordance with aspects of the present disclosure.

FIG. 9 illustrates an example of a configuration 900 that supports multi-symbol self-contained waveform design in accordance with aspects of the present disclosure. With reference to FIG. 2, base station 105-*a* and UE 115-*b* may support configuration 900, which may include a set of symbols 925 of a slot. Base station 105-*a* and UE 115-*a* may generate a waveform that is self-contained across the set of symbols 925 according to configuration 900. A slot may include a set of symbols 925, which may include data symbol periods 905 or reference signal symbol periods 915, or a combination thereof. The set of symbols 925 may have equal lengths. In some examples, different symbols 925 (e.g., OFDM symbols) may have different number of data samples K. Configuration 900 may consider these variable number of data symbol periods 905 per symbol 925.

Base station 105-*a* and UE 115-*b* may generate a waveform that is self-contained across symbols 925 with variable number of data symbol periods 905, by repeating a beginning portion of a reference signal sequence in the beginning of all data symbol periods 905 occurring before and after a reference signal symbol period 915 as a guard interval, or repeating an ending portion of a reference signal sequence in the end of all data symbol periods 905 occurring before and after the reference signal symbol period 915 as a guard interval. That is, symbols 925 may have one guard interval (at the beginning or at the ending, e.g., K-GI)), or two guard intervals (at both the beginning and the ending, e.g., K-2GI). The beginning guard interval may repeat a beginning portion of a reference signal sequence (e.g., DMRS sequence), and the ending guard interval repeat an ending portion of a reference signal sequence (e.g., DMRS sequence). Accordingly, configuration 900 may provide a consistent structure across the set of symbols 925, and placement of FFT window may be selected by a receiver (e.g., either base station 105-*a* and UE 115-*b*).

Figure 10:
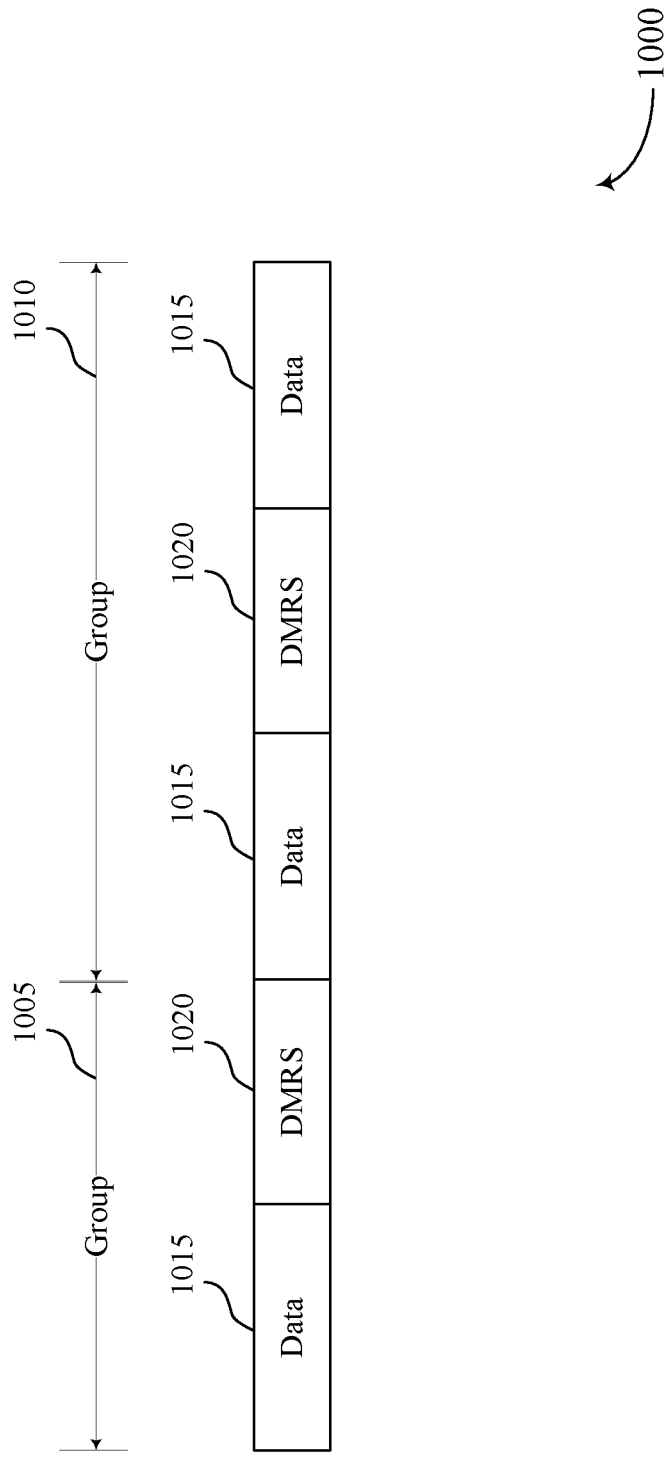

FIG. 10 illustrates an example of a configuration 1000 that supports multi-symbol self-contained waveform design in accordance with aspects of the present disclosure. With reference to FIG. 2, base station 105-*a* and UE 115-*b* may support configuration 1000, which may include multiple non-adjacent reference signal symbols (e.g., DMRS symbol periods). For example, additional reference signal symbol periods may be supported in time domain for a higher Doppler channel. Configuration 1000 may support multiple non-adjacent reference signal symbols by splitting symbols in PDSCH and PUSCH in groups within a single reference signal burst per group (e.g., DMRS burst per group). For example, group 1005 may include a single data symbol period 1015 and a reference signal symbol period 1020, while group 1010 may include data symbol periods 1015 and a reference signal symbol period 1020. Each group may be self-contained using any of the configurations illustrated in FIGS. 5 through 9. For example, base station 105-*a* and UE 115—may generate a waveform by concatenating a first waveform generated for group 1005 and a second waveform generated for group 1010.

Figure 11:
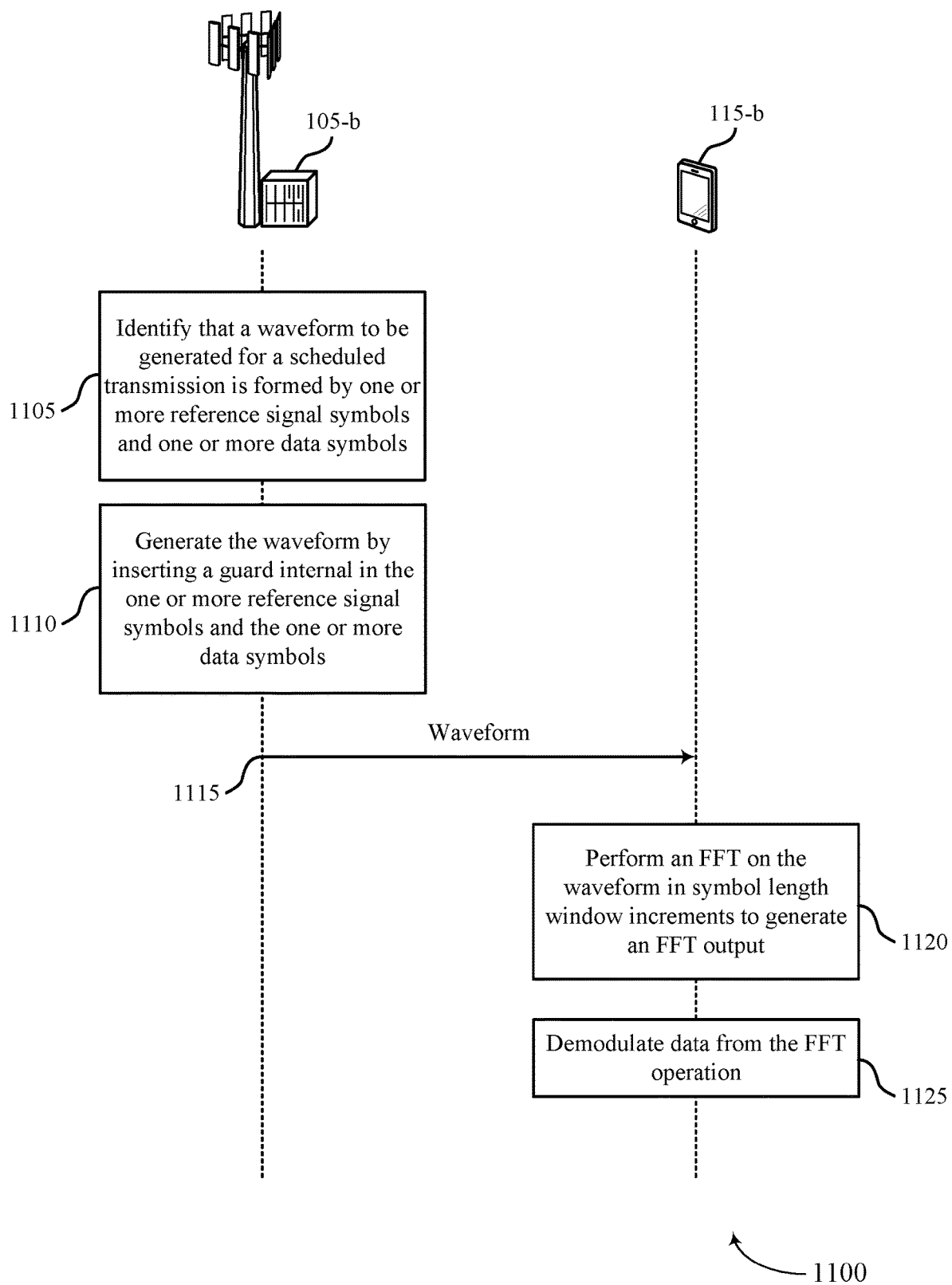
FIG. 11 illustrates an example of a process flow that supports multi-symbol self-contained waveform design in accordance with aspects of the present disclosure.

FIG. 11 illustrates an example of a process flow 1100 that supports multi-symbol self-contained waveform design in accordance with aspects of the present disclosure. Process flow 1100 may include base station 105-*b* and UE 115-*b*, which may be examples of the corresponding devices described with reference to FIGS. 1 and 2. In some examples, process flow 1100 may implement aspects of wireless communications systems 100 and 200. For example, base station 105-*b* and UE 115-*b* may support a waveform for a combination of reference symbol periods (e.g., demodulation reference signal symbols) and data symbol periods that may be self-contained. In other words, base station 105-*b* and UE 115-*b* may support a waveform that has a total length that may be a sum of each symbol period length. As a result, the improved waveform overcomes shortcoming of previous waveform designs (e.g., CP-OFDM waveforms), where a total length may be a sum of each symbol period, which may include a cyclic prefix plus data or control portion of each symbol period itself. In addition, for guard interval insertion-based waveforms, a total length of the waveform may be a sum of all symbol periods plus guard intervals associated with the symbol periods.

In the following description of process flow 1100, the operations between base station 105-*b* and UE 115-*b* may be transmitted in a different order than the exemplary order shown, or the operations performed by base station 105-*b* and UE 115-*b* may be performed in different orders or at different times. Certain operations may also be left out of process flow 1100, or other operations may be added to process flow 1100.

At 1105, base station 105-*b* may identify that a waveform to be generated for a scheduled transmission is formed by one or more reference signal symbols and one or more data symbols. In some examples, the waveform may be contained between a beginning boundary and an ending boundary with a duration equal to a total length of the one or more reference signal symbols and the one or more data symbols. At 1110, base station 105-*a* may generate the waveform by inserting a guard internal in the one or more reference signal symbols and the one or more data symbols. This may enable UE 115-*b* to perform an FFT for each of the one or more reference signal symbols and the one or more data symbols. At 1115, base station 105-*b* may transmit the waveform between the beginning boundary and the ending boundary. At 1120, UE 115-*b* may perform an FFT on the waveform in symbol length window increments to generate FFT output. At 1125, UE 115-*b* may demodulate data from the FFT output.

It is noted that, in certain examples, a base station is described herein as generating a waveform and transmitting the waveform to a UE, and the UE performs an FFT on the waveform in symbol period length increments. In some cases, up to one or more FFT windows may be shifted by a beginning or ending segment, and one or more FFT windows may be aligned with symbol boundaries between respective pairs of symbols. In other examples, the roles of the base station and UE may be reversed, and the UE may generate and transmit a waveform as described here, and the base station may perform the FFT processing as described herein.

Figure 12:
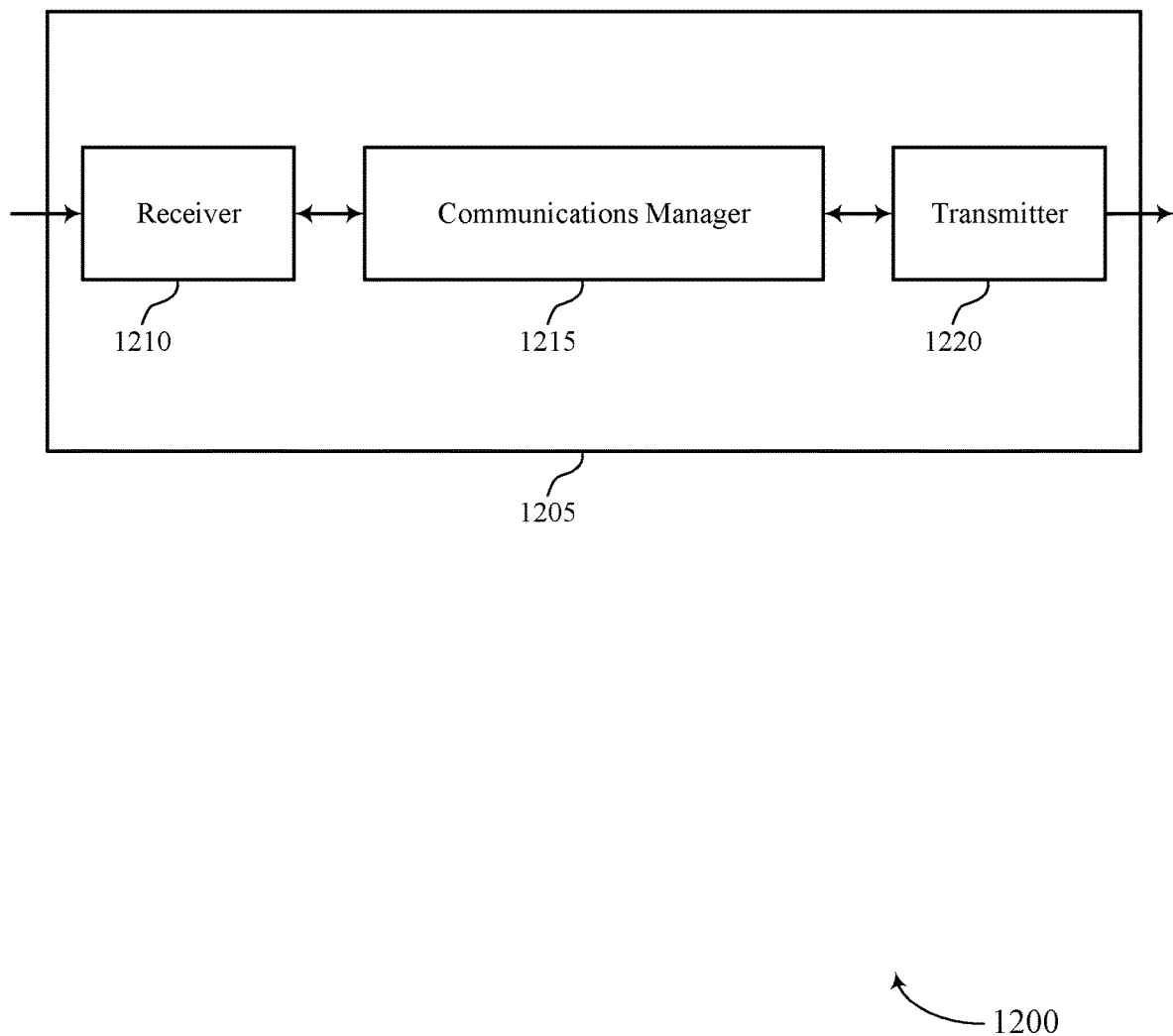
FIGS. 12 and 13 show block diagrams of devices that support multi-symbol self-contained waveform design in accordance with aspects of the present disclosure.

FIG. 12 shows a block diagram 1200 of a device 1205 that supports multi-symbol self-contained waveform design in accordance with aspects of the present disclosure. The device 1205 may be an example of aspects of a device as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to multi-symbol self-contained waveform design, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may identify that a waveform to be generated for a scheduled transmission is formed by one or more reference signal symbols and one or more data symbols, the waveform to be contained between a beginning boundary and an ending boundary with a duration equal to a total length of the one or more reference signal symbols and the one or more data symbols, generate the waveform by inserting a guard internal in the one or more reference signal symbols and the one or more data symbols to enable a receiver to perform an FFT for each of the one or more reference signal symbols and the one or more data symbols, and transmit the waveform between the beginning boundary and the ending boundary.

The communications manager 1215 may also receive a waveform formed by one or more reference signal symbols and one or more data symbols, the waveform contained between a beginning boundary and an ending boundary with a duration equal to a total length of the one or more reference signal symbols and the one or more data symbols, perform an FFT on the waveform in symbol length window increments to generate FFT output, and demodulate data from the FFT output. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
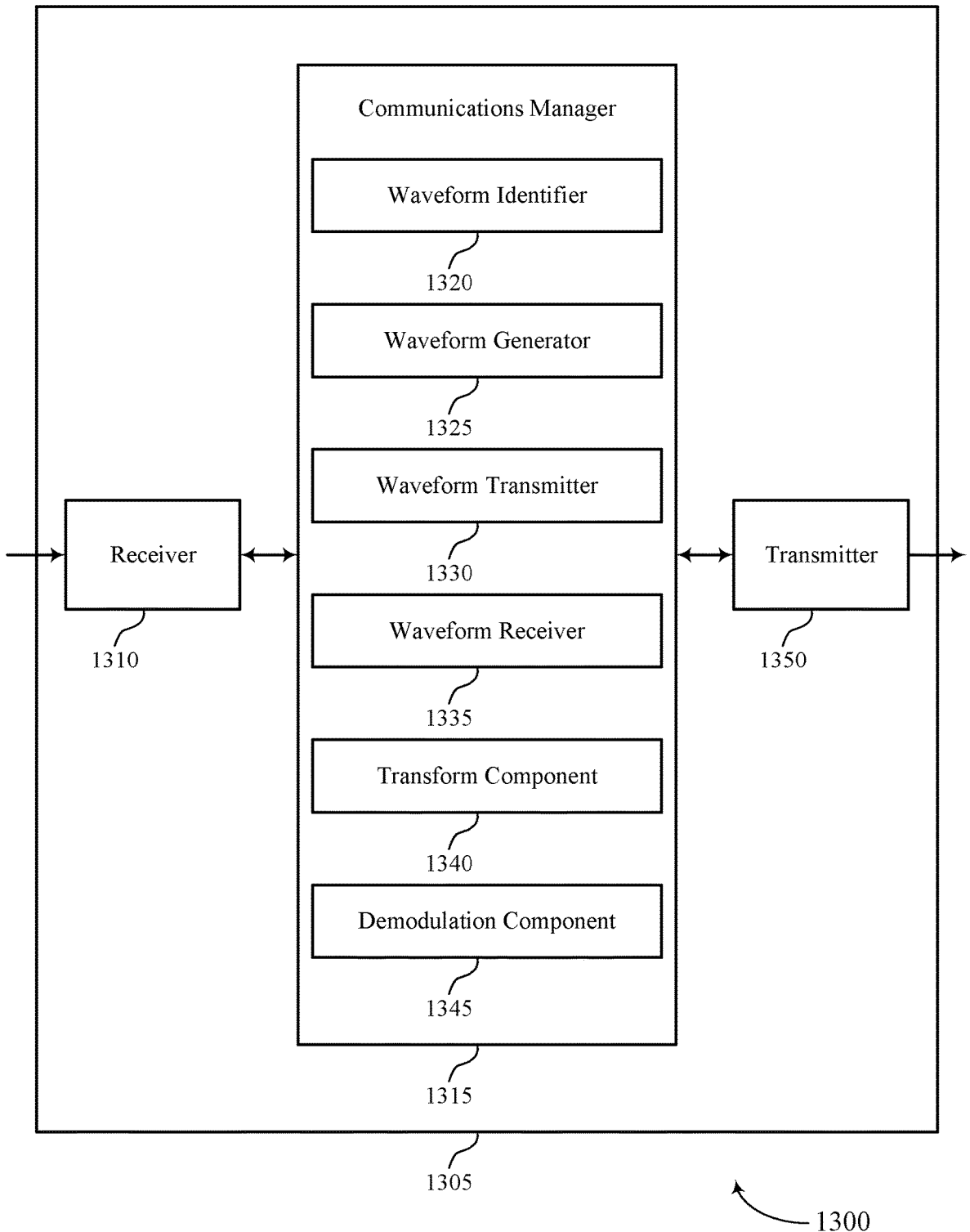

FIG. 13 shows a block diagram 1300 of a device 1305 that supports multi-symbol self-contained waveform design in accordance with aspects of the present disclosure. The device 1305 may be an example of aspects of a device 1205 or a device (e.g., a UE 115) as described herein. The device 1305 may include a receiver 1310, a communications manager 1315, and a transmitter 1350. The device 1305 may also include a processor. Each of these components may be in communication with one another (e.g., via one or more buses).

The receiver 1310 may receive information such as packets, user data, or control information associated with various information channels (e.g., control channels, data channels, and information related to multi-symbol self-contained waveform design, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a waveform identifier 1320, a waveform generator 1325, a waveform transmitter 1330, a waveform receiver 1335, a transform component 1340, and a demodulation component 1345. The communications manager 1315 may be an example of aspects of the communications manager 1510 described herein.

The waveform identifier 1320 may identify that a waveform to be generated for a scheduled transmission is formed by one or more reference signal symbols and one or more data symbols, the waveform to be contained between a beginning boundary and an ending boundary with a duration equal to a total length of the one or more reference signal symbols and the one or more data symbols. The waveform generator 1325 may generate the waveform by inserting a guard internal in the one or more reference signal symbols and the one or more data symbols to enable a receiver to perform an FFT for each of the one or more reference signal symbols and the one or more data symbols. The waveform transmitter 1330 may transmit the waveform between the beginning boundary and the ending boundary. The waveform receiver 1335 may receive a waveform formed by one or more reference signal symbols and one or more data symbols, the waveform contained between a beginning boundary and an ending boundary with a duration equal to a total length of the one or more reference signal symbols and the one or more data symbols. The transform component 1340 may perform an FFT on the waveform in symbol length window increments to generate FFT output. The demodulation component 1345 may demodulate data from the FFT output.

The transmitter 1350 may transmit signals generated by other components of the device 1305. In some examples, the transmitter 1350 may be collocated with a receiver 1310 in a transceiver module. For example, the transmitter 1350 may be an example of aspects of the transceiver 1520 described with reference to FIG. 15. The transmitter 1350 may utilize a single antenna or a set of antennas.

Figure 14:
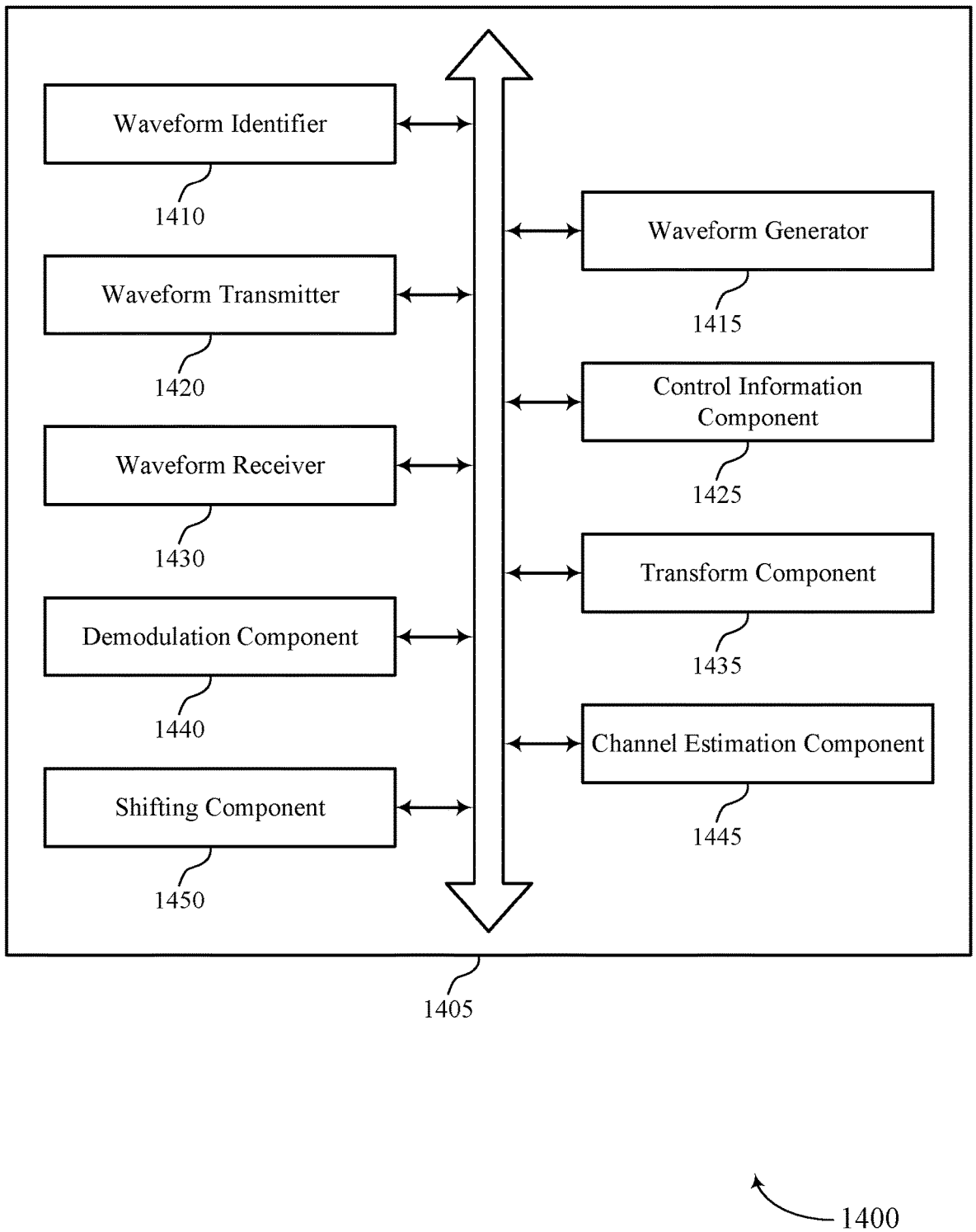
FIG. 14 shows a block diagram of a communications manager that supports multi-symbol self-contained waveform design in accordance with aspects of the present disclosure.

FIG. 14 shows a block diagram 1400 of a communications manager 1405 that supports multi-symbol self-contained waveform design in accordance with aspects of the present disclosure. The communications manager 1405 may be an example of aspects of a communications manager 1215, a communications manager 1315, or a communications manager 1510 described herein. The communications manager 1405 may include a waveform identifier 1410, a waveform generator 1415, a waveform transmitter 1420, a control information component 1425, a waveform receiver 1430, a transform component 1435, a demodulation component 1440, a channel estimation component 1445, and a shifting component 1450. Each of these modules may communicate, directly or indirectly, with one another (e.g., via one or more buses).

The waveform identifier 1410 may identify that a waveform to be generated for a scheduled transmission is formed by one or more reference signal symbols and one or more data symbols, the waveform to be contained between a beginning boundary and an ending boundary with a duration equal to a total length of the one or more reference signal symbols and the one or more data symbols. In some cases, the scheduled transmission formed by the one or more reference signal symbols and the one or more data symbols is formed by a first group of the one or more reference signal symbols and of the one or more data symbols and a second group of the one or more reference signal symbols and of the one or more data symbols. In some cases, the waveform is a DFT-S-OFDM waveform or a single carrier QAM waveform with guard interval.

The waveform generator 1415 may generate the waveform by inserting a guard internal in the one or more reference signal symbols and the one or more data symbols to enable a receiver to perform an FFT for each of the one or more reference signal symbols and the one or more data symbols. In some examples, the waveform generator 1415 may generate the waveform using a same reference signal sequence in a pair of adjacent reference signal symbols of the one or more reference signal symbols. In some examples, the waveform generator 1415 may generate the waveform, when first and second reference signal symbols of the one or more reference signal symbols are adjacent, based on including a first reference signal segment as a beginning segment in each of the first and second reference signal symbols and a second reference signal segment as an ending segment of each of the first and second reference signal symbols, and different middle segments in each of the first and second reference signal symbols. In some examples, the waveform generator 1415 may generate the waveform, when a data symbol of the one or more data symbols occurs prior to a reference signal symbol of the one or more reference signal symbols, based on repeating a beginning segment of a reference signal sequence of the reference signal symbol as a beginning segment in the data symbol as a guard interval.

In some examples, the waveform generator 1415 may generate the waveform, when a data symbol of the one or more data symbols occurs right after a reference signal symbol of the one or more reference signal symbols, based on repeating an ending segment of a reference signal sequence of the reference signal symbol as an ending segment in the data symbol as guard interval. In some examples, the waveform generator 1415 may generate the waveform, when the single reference signal symbol with a data symbol of the one or more data symbols occurs right after the single reference signal symbol, based on repeating a beginning segment of a reference signal sequence included in the single reference signal symbol as a beginning segment in the data symbol as a guard interval.

In some examples, the waveform generator 1415 may generate the waveform, when a data symbol of the one or more data symbols occurs right before the single reference signal symbol, based on repeating an ending segment of a reference signal sequence included in the single reference signal symbol as an ending segment in the data symbol as a guard interval. In some examples, the waveform generator 1415 may generate the waveform based on repeating a beginning segment of a reference signal sequence included in the single reference signal symbol as a beginning segment in all data symbols of the one or more data symbols that occur before and after the single reference signal symbol as a guard interval, and based on repeating an ending segment of the reference signal sequence as an ending segment in all the data symbols that occur before and after the single reference signal symbol as a guard interval.

In some examples, the waveform generator 1415 may generate the waveform by concatenating a first waveform generated for the first group and a second waveform generated for the second group. In some examples, the waveform generator 1415 may generate the first waveform contained between the beginning boundary and a second ending boundary with a duration equal to a total length of the one or more reference signal symbols and of the one or more data symbols in the first group. In some examples, the waveform generator 1415 may generate the second waveform contained between a second beginning boundary and the ending boundary with a duration equal to a total length of the one or more reference signal symbols and of the one or more data symbols in the second group.

The waveform transmitter 1420 may transmit the waveform between the beginning boundary and the ending boundary. The waveform receiver 1430 may receive a waveform formed by one or more reference signal symbols and one or more data symbols, the waveform contained between a beginning boundary and an ending boundary with a duration equal to a total length of the one or more reference signal symbols and the one or more data symbols. In some cases, a beginning segment of a reference signal sequence of a reference signal symbol of the one or more reference signal symbols is repeated as a beginning segment in each data symbol of the one or more data symbols that occurs prior to the reference signal symbol as guard interval. In some cases, an ending segment of a reference signal sequence of a reference signal symbol of the one or more reference signal symbols is repeated as an ending segment in each data symbol of the one or more data symbols that occur after the reference signal symbol as guard interval.

In some cases, the one or more reference signal symbols is a single reference signal symbol, and where a beginning segment of a reference signal sequence included in the single reference signal symbol is repeated as a beginning segment in a data symbol of the one or more data symbols that occurs right after the single reference signal symbol as a guard interval. In some cases, the one or more reference signal symbols is a single reference signal symbol, and where a beginning segment of a reference signal sequence included in the single reference signal symbol is repeated as a beginning segment in a data symbol of the one or more data symbols that occurs right before the single reference signal symbol as a guard interval. In some cases, the one or more reference signal symbols is a single reference signal symbol, and where a beginning segment of a reference signal sequence included in the single reference signal symbol is repeated as a beginning segment in all data symbols of the one or more data symbols that occur before and after the single reference signal symbol as a guard interval, and where an ending segment of the reference signal sequence is repeated as an ending segment in all the data symbols that occur before and after the single reference signal symbol as a guard interval.

In some cases, the waveform is formed by concatenating a first waveform generated for a first group of the one or more reference signal symbols and of the one or more data symbols and a second waveform generated for a second group of the one or more reference signal symbols and of the one or more data symbols. In some cases, the first waveform is contained between the beginning boundary and a second ending boundary with a duration equal to a total length of the one or more reference signal symbols and of the one or more data symbols in the first group. In some cases, the second waveform is contained between a second beginning boundary and the ending boundary with a duration equal to a total length of the one or more reference signal symbols and of the one or more data symbols in the second group. In some cases, the waveform is a DFT-S-OFDM waveform or a single carrier QAM waveform with guard interval.

The transform component 1435 may perform an FFT on the waveform in symbol length window increments to generate FFT output. In some cases, the FFT is performed on the single reference signal symbol using a symbol length window increment of the symbol length window increments that is aligned with a symbol boundary between the single reference signal symbol and the data symbol. The demodulation component 1440 may demodulate data from the FFT output. In some examples, the demodulation component 1440 may demodulate the data from the FFT output based on the channel estimate. The control information component 1425 may transmit control information allocating resources for the one or more reference signal symbols and the one or more data symbols. In some examples, the control information component 1425 may receive control information allocating resources for the one or more reference signal symbols and the one or more data symbols.

The channel estimation component 1445 may generate a channel estimate based on a subset of the FFT output corresponding to the one or more reference signal symbols. In some examples, the channel estimation component 1445 may generate a channel estimate based on a subset of the FFT output corresponding to the shifted symbol length window increment, where the data from the FFT output is demodulated based on the channel estimate. In some examples, the channel estimation component 1445 may generate a channel estimate from the FFT output corresponding to the reference signal symbol, where the data from the FFT output is demodulated based on the channel estimate. In some examples, the channel estimation component 1445 may generate a channel estimate corresponding to the single reference signal symbol, where the data from the FFT output is demodulated based on the channel estimate.

The shifting component 1450 may shift a first symbol length window increment of the symbol length window increments corresponding to a reference signal symbol of the one or more reference signal symbols by a length of a beginning segment of a reference signal sequence when first and second reference signal symbols of the one or more reference signal symbols are adjacent and each includes the reference signal sequence, where the FFT is performed on the reference signal symbol using the shifted symbol length window increment. In some examples, the shifting component 1450 may shift a first symbol length window increment of the symbol length window increments corresponding to a reference signal symbol of the one or more reference signal symbols by a length of a beginning segment of a reference signal sequence when first and second reference signal symbols of the one or more reference signal symbols are adjacent. In some examples, the shifting component 1450 may shift each of the symbol length window increments that occur prior to the reference signal symbol by a length of the beginning segment, where the FFT is performed on a subset of the one or more data symbols that occur prior to the reference signal symbol using a respective shifted symbol length window increment of the shifted symbol length window increments.

In some examples, the shifting component 1450 may align each of the symbol length window increments that occur after the reference signal symbol with a symbol period boundary, where the FFT is performed on each data symbol of the one or more data symbols that occur after the reference signal symbol using the aligned symbol length window increments. In some examples, the shifting component 1450 may shift a symbol length window increment of the symbol length window increments by a length of the beginning segment, where the FFT is performed on the single reference signal symbol using the shifted symbol length window increment. In some cases, a first reference signal segment is included as a beginning segment in each of the first and second reference signal symbols and a second reference signal segment is included as an ending segment in each of the first and second reference signal symbols, and different middle reference signal segments are respectively included as middle segments in each of the first and second reference signal symbols. In some cases, the FFT is performed on the first reference signal symbol using the shifted symbol length window increment and on the second reference signal symbol using a symbol length window increment aligned with a symbol boundary between the first and second reference signal symbols.

Figure 15:
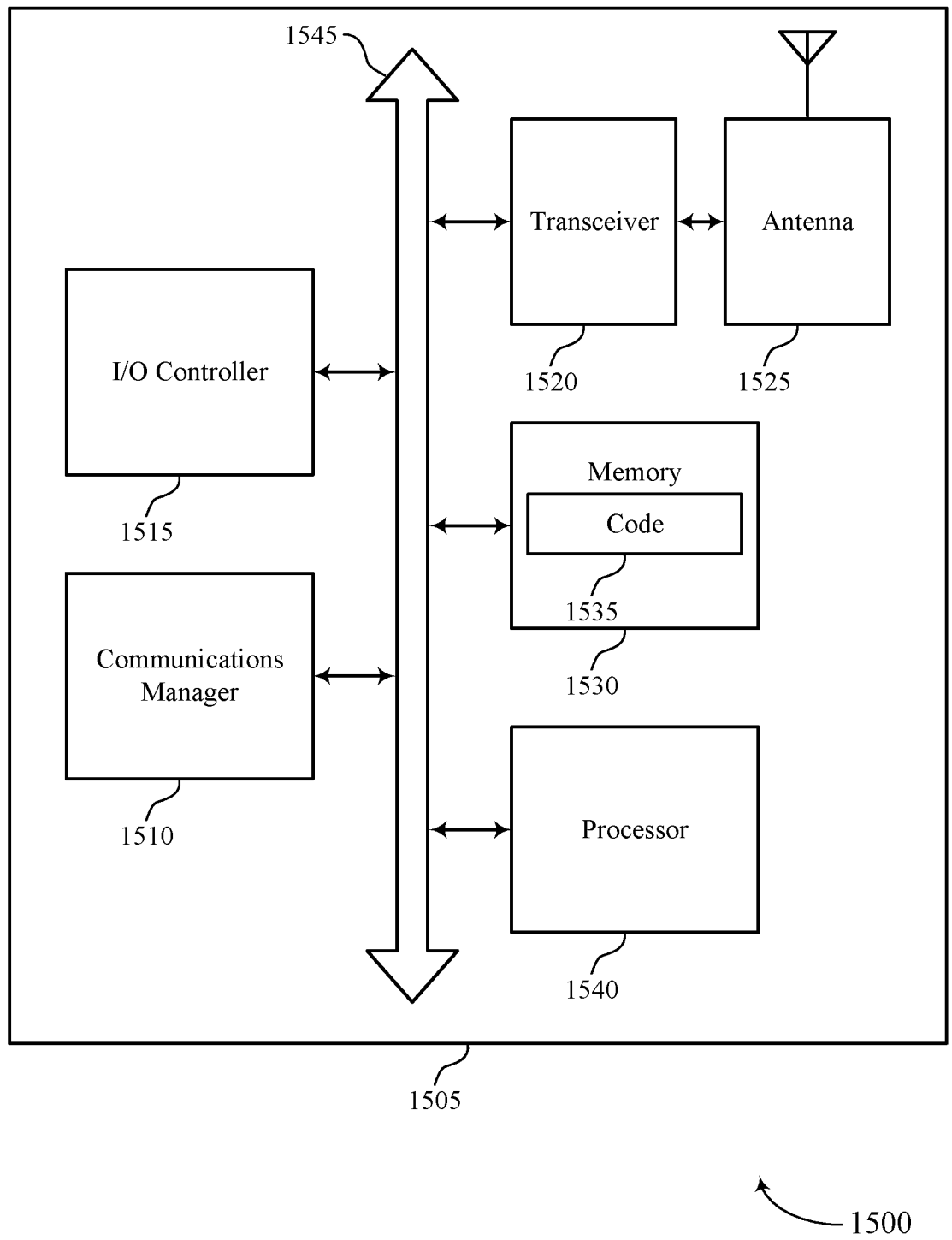
FIG. 15 shows a diagram of a system including a device that supports multi-symbol self-contained waveform design in accordance with aspects of the present disclosure.

FIG. 15 shows a diagram of a system 1500 including a device 1505 that supports multi-symbol self-contained waveform design in accordance with aspects of the present disclosure. The device 1505 may be an example of or include the components of device 1205, device 1305, or a device as described herein. The device 1505 may include components for bi-directional voice and data communications including components for transmitting and receiving communications, including a communications manager 1510, an I/O controller 1515, a transceiver 1520, an antenna 1525, memory 1530, and a processor 1540. These components may be in electronic communication via one or more buses (e.g., bus 1545).

The communications manager 1510 may identify that a waveform to be generated for a scheduled transmission is formed by one or more reference signal symbols and one or more data symbols, the waveform to be contained between a beginning boundary and an ending boundary with a duration equal to a total length of the one or more reference signal symbols and the one or more data symbols, generate the waveform by inserting a guard internal in the one or more reference signal symbols and the one or more data symbols to enable a receiver to perform an FFT for each of the one or more reference signal symbols and the one or more data symbols, and transmit the waveform between the beginning boundary and the ending boundary.

The communications manager 1510 may also receive a waveform formed by one or more reference signal symbols and one or more data symbols, the waveform contained between a beginning boundary and an ending boundary with a duration equal to a total length of the one or more reference signal symbols and the one or more data symbols, perform an FFT on the waveform in symbol length window increments to generate FFT output, and demodulate data from the FFT output.

The I/O controller 1515 may manage input and output signals for the device 1505. The I/O controller 1515 may also manage peripherals not integrated into the device 1505. In some cases, the I/O controller 1515 may represent a physical connection or port to an external peripheral. In some cases, the I/O controller 1515 may utilize an operating system such as iOS®, ANDROID®, MS-DOS®, MS-WINDOWS®, OS/2®, UNIX®, LINUX®, or another known operating system. In other cases, the I/O controller 1515 may represent or interact with a modem, a keyboard, a mouse, a touchscreen, or a similar device. In some cases, the I/O controller 1515 may be implemented as part of a processor. In some cases, a user may interact with the device 1505 via the I/O controller 1515 or via hardware components controlled by the I/O controller 1515.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas. In some cases, the device 1505 may include a single antenna 1525. However, in some cases the device 1505 may have more than one antenna 1525, which may be capable of concurrently transmitting or receiving multiple wireless transmissions.

The memory 1530 may include random-access memory (RAM) and read-only memory (ROM). The memory 1530 may store computer-readable, computer-executable code 1535 including instructions that, when executed, cause the processor to perform various functions described herein. In some cases, the memory 1530 may contain, among other things, a basic input/output system (BIOS) which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting multi-symbol self-contained waveform design).

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
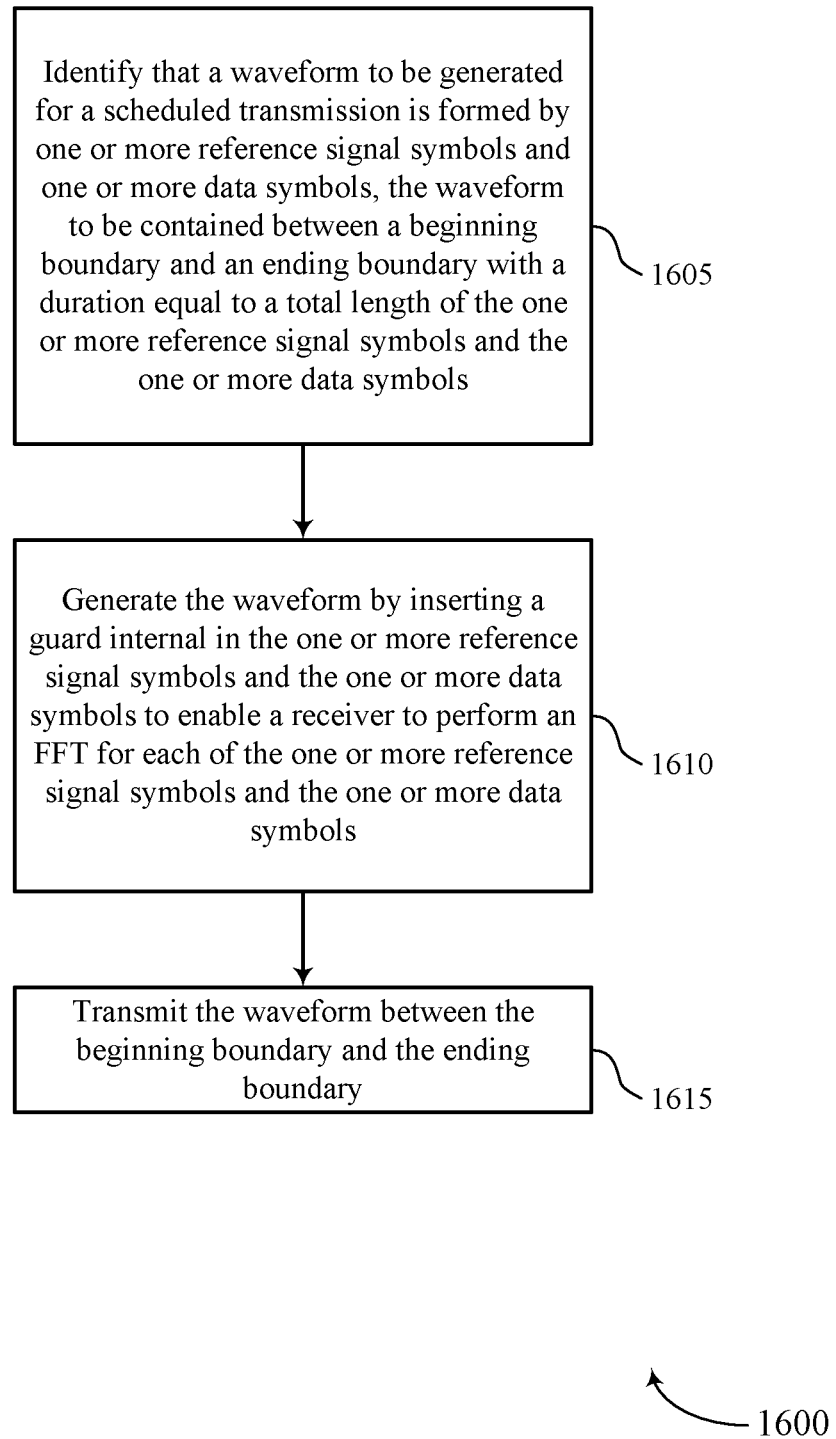
FIGS. 16 through 21 show flowcharts illustrating methods that support multi-symbol self-contained waveform design in accordance with aspects of the present disclosure.

FIG. 16 shows a flowchart illustrating a method 1600 that supports multi-symbol self-contained waveform design in accordance with aspects of the present disclosure. The operations of method 1600 may be implemented by a device or its components as described herein. For example, the operations of method 1600 may be performed by a communications manager as described with reference to FIGS. 12 through 15. In some examples, a device may execute a set of instructions to control the functional elements of the device to perform the functions described below. Additionally or alternatively, a device may perform aspects of the functions described below using special-purpose hardware.

At 1605, the device may identify that a waveform to be generated for a scheduled transmission is formed by one or more reference signal symbols and one or more data symbols, the waveform to be contained between a beginning boundary and an ending boundary with a duration equal to a total length of the one or more reference signal symbols and the one or more data symbols. The operations of 1605 may be performed according to the methods described herein. In some examples, aspects of the operations of 1605 may be performed by a waveform identifier as described with reference to FIGS. 12 through 15.

At 1610, the device may generate the waveform by inserting a guard internal in the one or more reference signal symbols and the one or more data symbols to enable a receiver to perform an FFT for each of the one or more reference signal symbols and the one or more data symbols. The operations of 1610 may be performed according to the methods described herein. In some examples, aspects of the operations of 1610 may be performed by a waveform generator as described with reference to FIGS. 12 through 15.

At 1615, the device may transmit the waveform between the beginning boundary and the ending boundary. The operations of 1615 may be performed according to the methods described herein. In some examples, aspects of the operations of 1615 may be performed by a waveform transmitter as described with reference to FIGS. 12 through 15.

Figure 17:
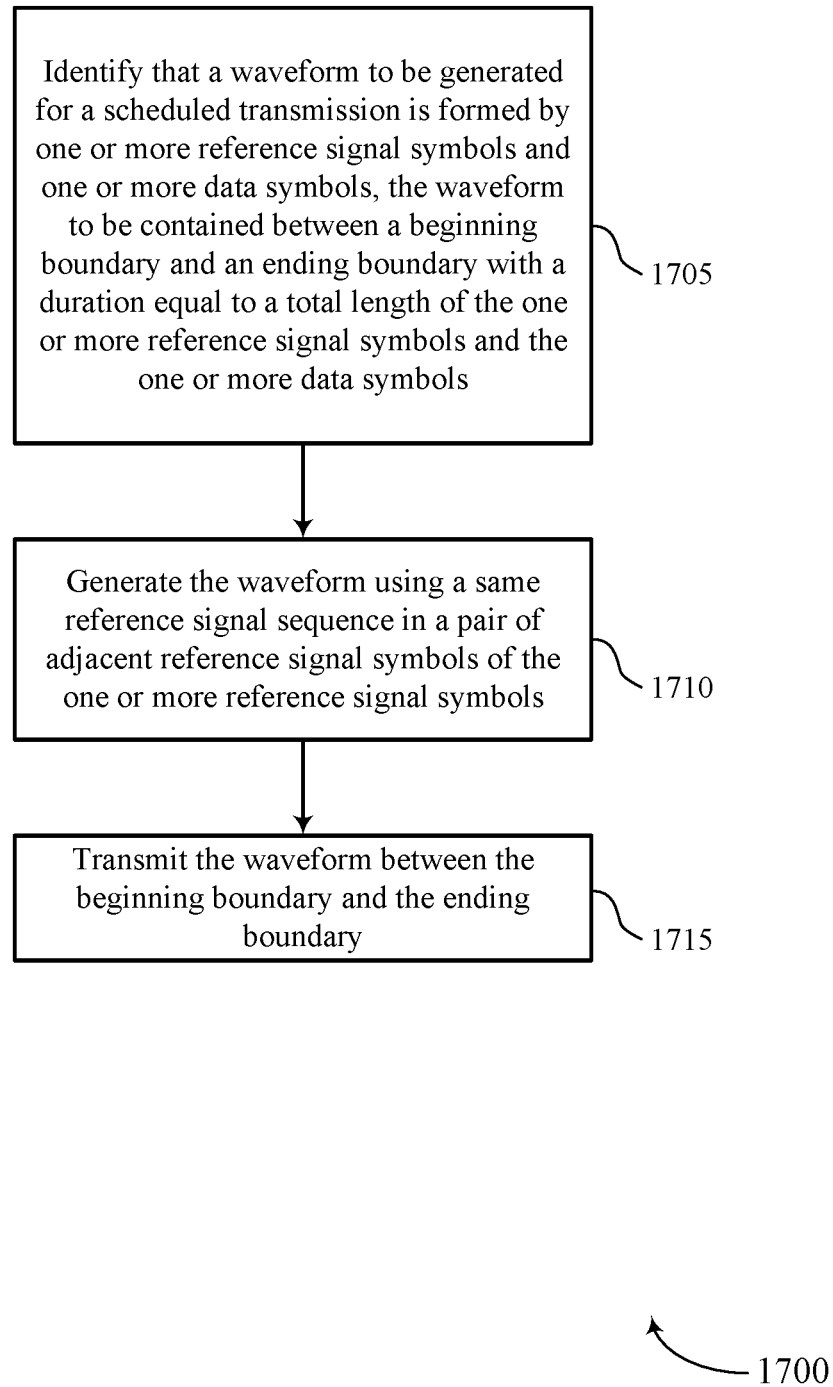

FIG. 17 shows a flowchart illustrating a method 1700 that supports multi-symbol self-contained waveform design in accordance with aspects of the present disclosure. The operations of method 1700 may be implemented by a device or its components as described herein. For example, the operations of method 1700 may be performed by a communications manager as described with reference to FIGS. 12 through 15. In some examples, a device may execute a set of instructions to control the functional elements of the device to perform the functions described below. Additionally or alternatively, a device may perform aspects of the functions described below using special-purpose hardware.

At 1705, the device may identify that a waveform to be generated for a scheduled transmission is formed by one or more reference signal symbols and one or more data symbols, the waveform to be contained between a beginning boundary and an ending boundary with a duration equal to a total length of the one or more reference signal symbols and the one or more data symbols. The operations of 1705 may be performed according to the methods described herein. In some examples, aspects of the operations of 1705 may be performed by a waveform identifier as described with reference to FIGS. 12 through 15.

At 1710, the device may generate the waveform using a same reference signal sequence in a pair of adjacent reference signal symbols of the one or more reference signal symbols. The operations of 1710 may be performed according to the methods described herein. In some examples, aspects of the operations of 1710 may be performed by a waveform generator as described with reference to FIGS. 12 through 15.

At 1715, the device may transmit the waveform between the beginning boundary and the ending boundary. The operations of 1715 may be performed according to the methods described herein. In some examples, aspects of the operations of 1715 may be performed by a waveform transmitter as described with reference to FIGS. 12 through 15.

Figure 18:
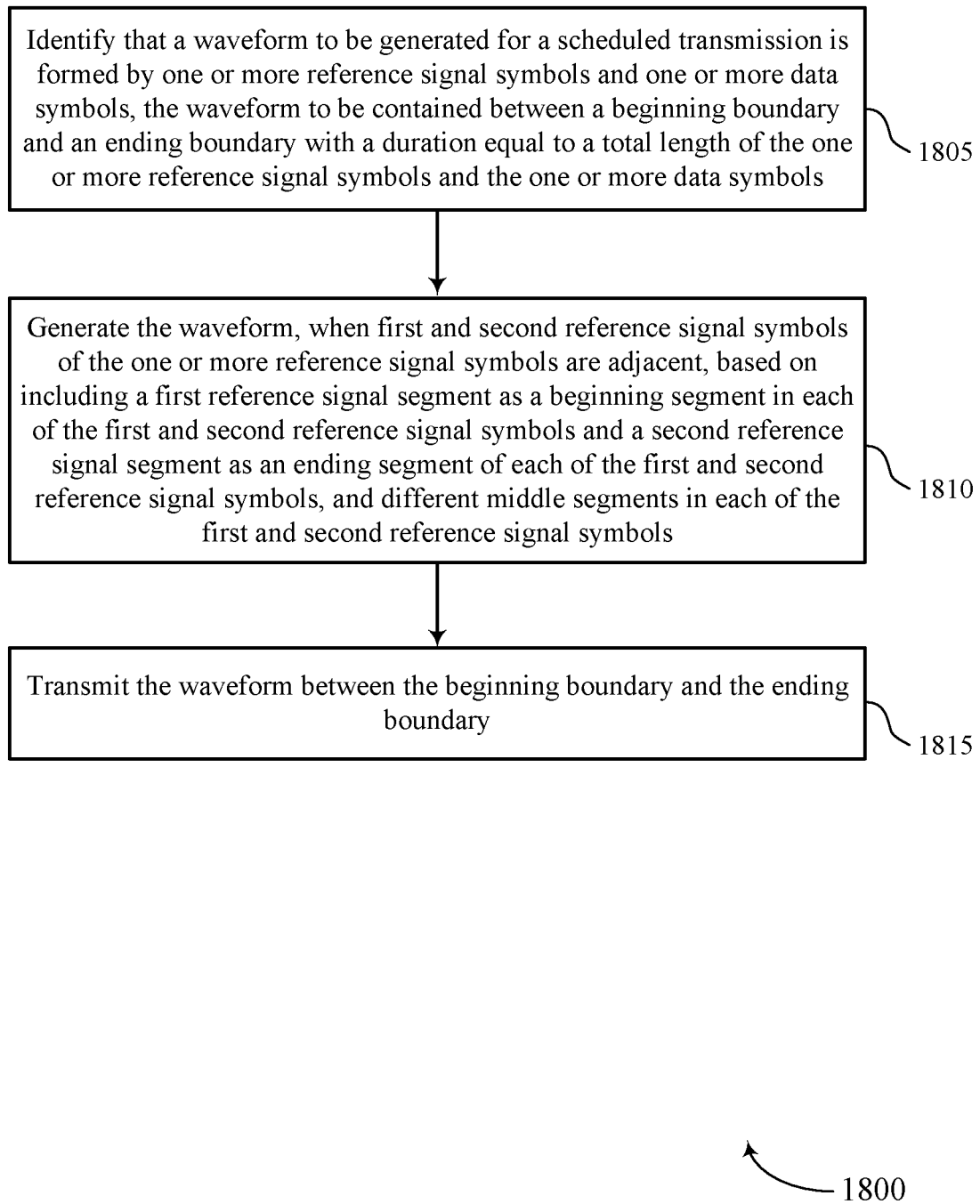

FIG. 18 shows a flowchart illustrating a method 1800 that supports multi-symbol self-contained waveform design in accordance with aspects of the present disclosure. The operations of method 1800 may be implemented by a device or its components as described herein. For example, the operations of method 1800 may be performed by a communications manager as described with reference to FIGS. 12 through 15. In some examples, a device may execute a set of instructions to control the functional elements of the device to perform the functions described below. Additionally or alternatively, a device may perform aspects of the functions described below using special-purpose hardware.

At 1805, the device may identify that a waveform to be generated for a scheduled transmission is formed by one or more reference signal symbols and one or more data symbols, the waveform to be contained between a beginning boundary and an ending boundary with a duration equal to a total length of the one or more reference signal symbols and the one or more data symbols. The operations of 1805 may be performed according to the methods described herein. In some examples, aspects of the operations of 1805 may be performed by a waveform identifier as described with reference to FIGS. 12 through 15.

At 1810, the device may generate the waveform, when first and second reference signal symbols of the one or more reference signal symbols are adjacent, based on including a first reference signal segment as a beginning segment in each of the first and second reference signal symbols and a second reference signal segment as an ending segment of each of the first and second reference signal symbols, and different middle segments in each of the first and second reference signal symbols. The operations of 1810 may be performed according to the methods described herein. In some examples, aspects of the operations of 1810 may be performed by a waveform generator as described with reference to FIGS. 12 through 15.

At 1815, the device may transmit the waveform between the beginning boundary and the ending boundary. The operations of 1815 may be performed according to the methods described herein. In some examples, aspects of the operations of 1815 may be performed by a waveform transmitter as described with reference to FIGS. 12 through 15.

Figure 19:
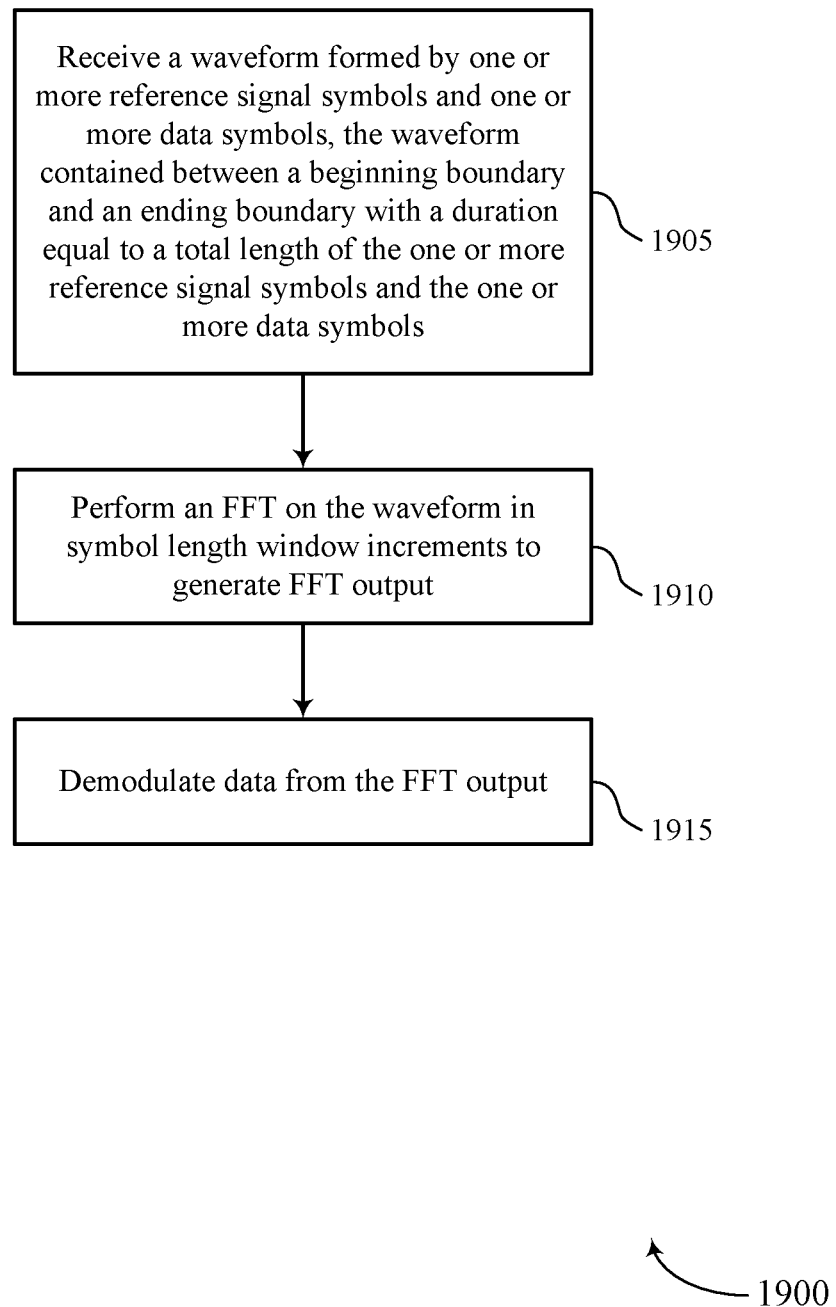

FIG. 19 shows a flowchart illustrating a method 1900 that supports multi-symbol self-contained waveform design in accordance with aspects of the present disclosure. The operations of method 1900 may be implemented by a device or its components as described herein. For example, the operations of method 1900 may be performed by a communications manager as described with reference to FIGS. 12 through 15. In some examples, a device may execute a set of instructions to control the functional elements of the device to perform the functions described below. Additionally or alternatively, a device may perform aspects of the functions described below using special-purpose hardware.

At 1905, the device may receive a waveform formed by one or more reference signal symbols and one or more data symbols, the waveform contained between a beginning boundary and an ending boundary with a duration equal to a total length of the one or more reference signal symbols and the one or more data symbols. The operations of 1905 may be performed according to the methods described herein. In some examples, aspects of the operations of 1905 may be performed by a waveform receiver as described with reference to FIGS. 12 through 15.

At 1910, the device may perform an FFT on the waveform in symbol length window increments to generate FFT output. The operations of 1910 may be performed according to the methods described herein. In some examples, aspects of the operations of 1910 may be performed by a transform component as described with reference to FIGS. 12 through 15.

At 1915, the device may demodulate data from the FFT output. The operations of 1915 may be performed according to the methods described herein. In some examples, aspects of the operations of 1915 may be performed by a demodulation component as described with reference to FIGS. 12 through 15.

Figure 20:
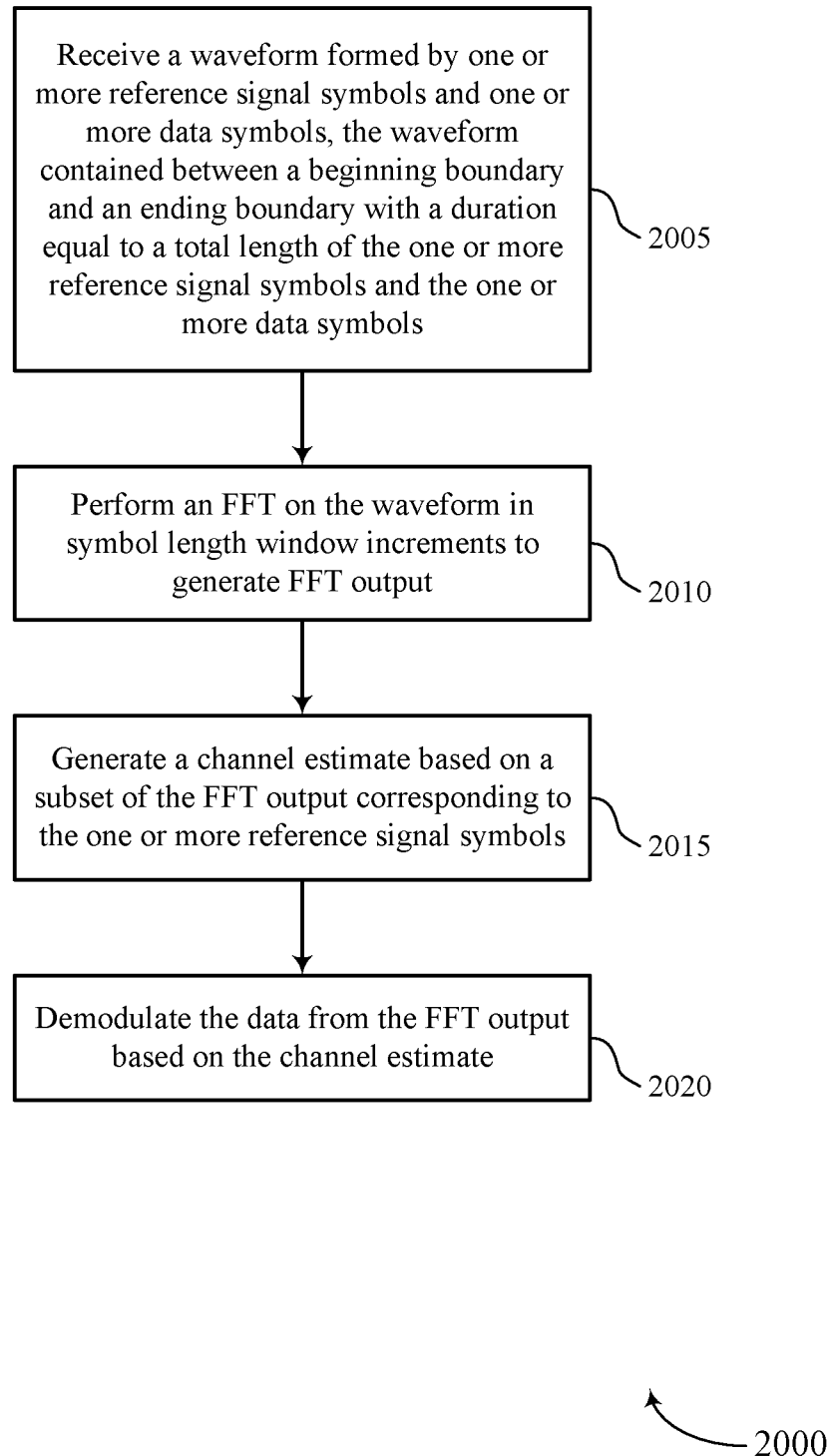

FIG. 20 shows a flowchart illustrating a method 2000 that supports multi-symbol self-contained waveform design in accordance with aspects of the present disclosure. The operations of method 2000 may be implemented by a device or its components as described herein. For example, the operations of method 2000 may be performed by a communications manager as described with reference to FIGS. 12 through 15. In some examples, a device may execute a set of instructions to control the functional elements of the device to perform the functions described below. Additionally or alternatively, a device may perform aspects of the functions described below using special-purpose hardware.

At 2005, the device may receive a waveform formed by one or more reference signal symbols and one or more data symbols, the waveform contained between a beginning boundary and an ending boundary with a duration equal to a total length of the one or more reference signal symbols and the one or more data symbols. The operations of 2005 may be performed according to the methods described herein. In some examples, aspects of the operations of 2005 may be performed by a waveform receiver as described with reference to FIGS. 12 through 15.

At 2010, the device may perform an FFT on the waveform in symbol length window increments to generate FFT output. The operations of 2010 may be performed according to the methods described herein. In some examples, aspects of the operations of 2010 may be performed by a transform component as described with reference to FIGS. 12 through 15.

At 2015, the device may generate a channel estimate based on a subset of the FFT output corresponding to the one or more reference signal symbols. The operations of 2015 may be performed according to the methods described herein. In some examples, aspects of the operations of 2015 may be performed by a channel estimation component as described with reference to FIGS. 12 through 15.

At 2020, the device may demodulate the data from the FFT output based on the channel estimate. The operations of 2020 may be performed according to the methods described herein. In some examples, aspects of the operations of 2020 may be performed by a demodulation component as described with reference to FIGS. 12 through 15.

Figure 21:
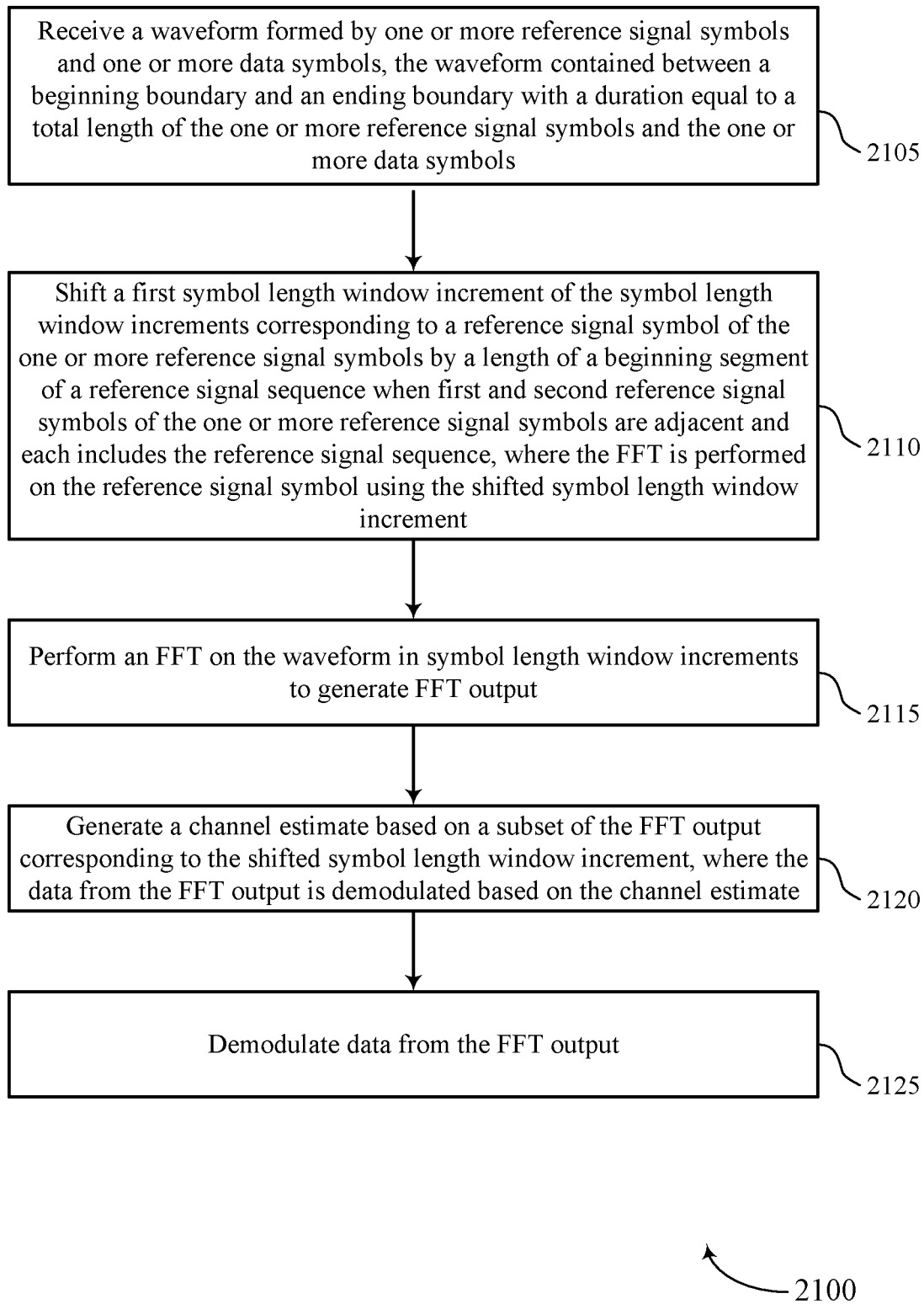

FIG. 21 shows a flowchart illustrating a method 2100 that supports multi-symbol self-contained waveform design in accordance with aspects of the present disclosure. The operations of method 2100 may be implemented by a device or its components as described herein. For example, the operations of method 2100 may be performed by a communications manager as described with reference to FIGS. 12 through 15. In some examples, a device may execute a set of instructions to control the functional elements of the device to perform the functions described below. Additionally or alternatively, a device may perform aspects of the functions described below using special-purpose hardware.

At 2105, the device may receive a waveform formed by one or more reference signal symbols and one or more data symbols, the waveform contained between a beginning boundary and an ending boundary with a duration equal to a total length of the one or more reference signal symbols and the one or more data symbols. The operations of 2105 may be performed according to the methods described herein. In some examples, aspects of the operations of 2105 may be performed by a waveform receiver as described with reference to FIGS. 12 through 15.

At 2110, the device may shift a first symbol length window increment of the symbol length window increments corresponding to a reference signal symbol of the one or more reference signal symbols by a length of a beginning segment of a reference signal sequence when first and second reference signal symbols of the one or more reference signal symbols are adjacent and each includes the reference signal sequence, where the FFT is performed on the reference signal symbol using the shifted symbol length window increment. The operations of 2110 may be performed according to the methods described herein. In some examples, aspects of the operations of 2110 may be performed by a shifting component as described with reference to FIGS. 12 through 15.

At 2115, the device may perform an FFT on the waveform in symbol length window increments to generate FFT output. The operations of 2115 may be performed according to the methods described herein. In some examples, aspects of the operations of 2115 may be performed by a transform component as described with reference to FIGS. 12 through 15.

At 2120, the device may generate a channel estimate based on a subset of the FFT output corresponding to the shifted symbol length window increment, where the data from the FFT output is demodulated based on the channel estimate. The operations of 2120 may be performed according to the methods described herein. In some examples, aspects of the operations of 2120 may be performed by a channel estimation component as described with reference to FIGS. 12 through 15.

At 2125, the device may demodulate data from the FFT output. The operations of 2125 may be performed according to the methods described herein. In some examples, aspects of the operations of 2125 may be performed by a demodulation component as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
receiving a waveform formed by one or more reference signal symbols and one or more data symbols, the waveform contained between a beginning boundary and an ending boundary with a duration equal to a total length of the one or more reference signal symbols and the one or more data symbols, wherein a segment of a reference signal sequence of a reference signal symbol of the one or more reference signal symbols is repeated as a beginning segment or an ending segment in at least one data symbol of the one or more data symbols as a guard interval;
performing a fast Fourier transform (FFT) on the waveform in symbol length window increments to generate FFT output; and
demodulating data from the FFT output.

2. The method of claim 1, wherein demodulating the data comprises:
generating a channel estimate based at least in part on a subset of the FFT output corresponding to the one or more reference signal symbols; and
demodulating the data from the FFT output based at least in part on the channel estimate.

3. The method of claim 1, further comprising:
shifting a first symbol length window increment of the symbol length window increments corresponding to the reference signal symbol of the one or more reference signal symbols by a length of the beginning segment of the reference signal sequence when first and second reference signal symbols of the one or more reference signal symbols are adjacent and each includes the reference signal sequence, wherein the FFT is performed on the reference signal symbol using the shifted first symbol length window increment.

4. The method of claim 1, further comprising:
shifting a first symbol length window increment of the symbol length window increments corresponding to the reference signal symbol of the one or more reference signal symbols by a length of the beginning segment of the reference signal sequence when first and second reference signal symbols of the one or more reference signal symbols are adjacent.

5. The method of claim 4, wherein a first reference signal segment is included as a beginning segment in each of the first and second reference signal symbols and a second reference signal segment is included as an ending segment in each of the first and second reference signal symbols, and different middle reference signal segments are respectively included as middle segments in each of the first and second reference signal symbols.

6. The method of claim 4, wherein the FFT is performed on the first reference signal symbol using the shifted first symbol length window increment and on the second reference signal symbol using a symbol length window increment aligned with a symbol boundary between the first and second reference signal symbols.

7. The method of claim 1, wherein the beginning segment of the reference signal sequence of the reference signal symbol of the one or more reference signal symbols is repeated as the beginning segment in each data symbol of the one or more data symbols that occurs prior to the reference signal symbol as the guard interval, the method further comprising:
shifting each of the symbol length window increments that occur prior to the reference signal symbol by a length of the beginning segment, wherein the FFT is performed on a subset of the one or more data symbols that occur prior to the reference signal symbol using a respective shifted symbol length window increment of the shifted symbol length window increments.

8. The method of claim 1, wherein the ending segment of the reference signal sequence of the reference signal symbol of the one or more reference signal symbols is repeated as the ending segment in each data symbol of the one or more data symbols that occur after the reference signal symbol as the guard interval, the method further comprising:
aligning each of the symbol length window increments that occur after the reference signal symbol with a symbol period boundary, wherein the FFT is performed on each data symbol of the one or more data symbols that occur after the reference signal symbol using the aligned symbol length window increments.

9. The method of claim 1, wherein the one or more reference signal symbols is a single reference signal symbol, and wherein a beginning segment of a reference signal sequence included in the single reference signal symbol is repeated as a beginning segment in a data symbol of the one or more data symbols that occurs right after the single reference signal symbol as a guard interval.

10. The method of claim 1, wherein the one or more reference signal symbols is a single reference signal symbol, and wherein a beginning segment of a reference signal sequence included in the single reference signal symbol is repeated as a beginning segment in a data symbol of the one or more data symbols that occurs right before the single reference signal symbol as a guard interval.

11. The method of claim 1, wherein the one or more reference signal symbols is a single reference signal symbol, and wherein a beginning segment of a reference signal sequence included in the single reference signal symbol is repeated as a beginning segment in all data symbols of the one or more data symbols that occur before and after the single reference signal symbol as a guard interval, and wherein an ending segment of the reference signal sequence is repeated as an ending segment in all the data symbols that occur before and after the single reference signal symbol as a guard interval.

12. The method of claim 1, wherein the waveform is formed by concatenating a first waveform generated for a first group of the one or more reference signal symbols and of the one or more data symbols and a second waveform generated for a second group of the one or more reference signal symbols and of the one or more data symbols.

13. An apparatus for wireless communications, comprising:
a processor,
memory coupled with the processor; and
instructions stored in the memory and executable by the processor to cause the apparatus to:
receive a waveform formed by one or more reference signal symbols and one or more data symbols, the waveform contained between a beginning boundary and an ending boundary with a duration equal to a total length of the one or more reference signal symbols and the one or more data symbols, wherein a segment of a reference signal sequence of a reference signal symbol of the one or more reference signal symbols is repeated as a beginning segment or an ending segment in at least one data symbol of the one or more data symbols as a guard interval;
perform a fast Fourier transform (FFT) on the waveform in symbol length window increments to generate FFT output; and
demodulate data from the FFT output.

14. The apparatus of claim 13, wherein the instructions to demodulate the data are executable by the processor to cause the apparatus to:
generate a channel estimate based at least in part on a subset of the FFT output corresponding to the one or more reference signal symbols; and
demodulate the data from the FFT output based at least in part on the channel estimate.

15. The apparatus of claim 13, wherein the instructions are further executable by the processor to cause the apparatus to:
shift a first symbol length window increment of the symbol length window increments corresponding to the reference signal symbol of the one or more reference signal symbols by a length of the beginning segment of the reference signal sequence when first and second reference signal symbols of the one or more reference signal symbols are adjacent and each includes the reference signal sequence, wherein the FFT is performed on the reference signal symbol using the shifted first symbol length window increment.

16. The apparatus of claim 13, wherein the instructions are further executable by the processor to cause the apparatus to:
shift a first symbol length window increment of the symbol length window increments corresponding to the reference signal symbol of the one or more reference signal symbols by a length of the beginning segment of the reference signal sequence when first and second reference signal symbols of the one or more reference signal symbols are adjacent.

17. The apparatus of claim 13, wherein the beginning segment of the reference signal sequence of the reference signal symbol of the one or more reference signal symbols is repeated as a beginning segment in each data symbol of the one or more data symbols that occurs prior to the reference signal symbol as the guard interval, wherein the instructions are further executable by the processor to:
shift each of the symbol length window increments that occur prior to the reference signal symbol by a length of the beginning segment, wherein the FFT is performed on a subset of the one or more data symbols that occur prior to the reference signal symbol using a respective shifted symbol length window increment of the shifted symbol length window increments.

18. The apparatus of claim 13, wherein the ending segment of the reference signal sequence of the reference signal symbol of the one or more reference signal symbols is repeated as an ending segment in each data symbol of the one or more data symbols that occur after the reference signal symbol as the guard interval, wherein the instructions are further executable by the processor to:

align each of the symbol length window increments that occur after the reference signal symbol with a symbol period boundary, wherein the FFT is performed on each data symbol of the one or more data symbols that occur after the reference signal symbol using the aligned symbol length window increments.

19. The apparatus of claim 13, wherein the one or more reference signal symbols is a single reference signal symbol, and wherein a beginning segment of a reference signal sequence included in the single reference signal symbol is repeated as a beginning segment in a data symbol of the one or more data symbols that occurs right after the single reference signal symbol as a guard interval.

20. The apparatus of claim 13, wherein the one or more reference signal symbols is a single reference signal symbol, and wherein a beginning segment of a reference signal sequence included in the single reference signal symbol is repeated as a beginning segment in a data symbol of the one or more data symbols that occurs right before the single reference signal symbol as a guard interval.

21. The apparatus of claim 13, wherein the one or more reference signal symbols is a single reference signal symbol, and wherein a beginning segment of a reference signal sequence included in the single reference signal symbol is repeated as a beginning segment in all data symbols of the one or more data symbols that occur before and after the single reference signal symbol as a guard interval, and wherein an ending segment of the reference signal sequence is repeated as an ending segment in all the data symbols that occur before and after the single reference signal symbol as a guard interval.

22. The apparatus of claim 13, wherein the waveform is formed by concatenating a first waveform generated for a first group of the one or more reference signal symbols and of the one or more data symbols and a second waveform generated for a second group of the one or more reference signal symbols and of the one or more data symbols.

23. An apparatus for wireless communications, comprising:
means for receiving a waveform formed by one or more reference signal symbols and one or more data symbols, the waveform contained between a beginning boundary and an ending boundary with a duration equal to a total length of the one or more reference signal symbols and the one or more data symbols, wherein a segment of a reference signal sequence of a reference signal symbol of the one or more reference signal symbols is repeated as a beginning segment or an ending segment in at least one data symbol of the one or more data symbols as a guard interval;
means for performing a fast Fourier transform (FFT) on the waveform in symbol length window increments to generate FFT output; and
means for demodulating data from the FFT output.

24. The apparatus of claim 23, wherein the means for demodulating the data comprises:
means for generating a channel estimate based at least in part on a subset of the FFT output corresponding to the one or more reference signal symbols; and
means for demodulating the data from the FFT output based at least in part on the channel estimate.

25. The apparatus of claim 23, further comprising:
means for shifting a first symbol length window increment of the symbol length window increments corresponding to the reference signal symbol of the one or more reference signal symbols by a length of the beginning segment of the reference signal sequence when first and second reference signal symbols of the one or more reference signal symbols are adjacent and each includes the reference signal sequence, wherein the FFT is performed on the reference signal symbol using the shifted first symbol length window increment.

26. The apparatus of claim 23, further comprising:
means for shifting a first symbol length window increment of the symbol length window increments corresponding to the reference signal symbol of the one or more reference signal symbols by a length of the beginning segment of the reference signal sequence when first and second reference signal symbols of the one or more reference signal symbols are adjacent.

27. The apparatus of claim 26, wherein a first reference signal segment is included as a beginning segment in each of the first and second reference signal symbols and a second reference signal segment is included as an ending segment in each of the first and second reference signal symbols, and different middle reference signal segments are respectively included as middle segments in each of the first and second reference signal symbols.

28. The apparatus of claim 26, wherein the FFT is performed on the first reference signal symbol using the shifted symbol length window increment and on the second reference signal symbol using a symbol length window increment aligned with a symbol boundary between the first and second reference signal symbols.

29. The apparatus of claim 23, wherein the beginning segment of the reference signal sequence of the reference signal symbol of the one or more reference signal symbols is repeated as a beginning segment in each data symbol of the one or more data symbols that occurs prior to the reference signal symbol as the guard interval, the apparatus further comprising:
means for shifting each of the symbol length window increments that occur prior to the reference signal symbol by a length of the beginning segment, wherein the FFT is performed on a subset of the one or more data symbols that occur prior to the reference signal symbol using a respective shifted symbol length window increment of the shifted symbol length window increments.

30. A non-transitory computer-readable medium storing code for wireless communications, the code comprising instructions executable by a processor to:
receive a waveform formed by one or more reference signal symbols and one or more data symbols, the waveform contained between a beginning boundary and an ending boundary with a duration equal to a total length of the one or more reference signal symbols and the one or more data symbols, wherein a segment of a reference signal sequence of a reference signal symbol of the one or more reference signal symbols is repeated as a beginning segment or an ending segment in at least one data symbol of the one or more data symbols as a guard interval;
perform a fast Fourier transform (FFT) on the waveform in symbol length window increments to generate FFT output; and
demodulate data from the FFT output.

* * * * *